US012791001B2

(12) United States Patent
Matsutake et al.

(10) Patent No.: US 12,791,001 B2
(45) Date of Patent: Nov. 10, 2026

(54) COUPLING BODY, FUEL INJECTION VALVE INCLUDING COUPLING BODY, AND METHOD FOR MANUFACTURING COUPLING BODY

(71) Applicant: Hitachi Astemo, Ltd., Hitachinaka (JP)

(72) Inventors: Ryohei Matsutake, Hitachinaka (JP); Kenichi Gunji, Hitachinaka (JP); Yuta Yanagisawa, Hitachinaka (JP); Masato Higuma, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 860 days.

(21) Appl. No.: 18/010,500

(22) PCT Filed: May 18, 2021

(86) PCT No.: PCT/JP2021/018838
§ 371 (c)(1),
(2) Date: Dec. 15, 2022

(87) PCT Pub. No.: WO2022/014142
PCT Pub. Date: Jan. 20, 2022

(65) Prior Publication Data
US 2023/0243326 A1 Aug. 3, 2023

(30) Foreign Application Priority Data
Jul. 14, 2020 (JP) ................................ 2020-120613

(51) Int. Cl.
*F02M 61/16* (2006.01)
*B23P 11/02* (2006.01)
*F02M 61/10* (2006.01)

(52) U.S. Cl.
CPC ............ *F02M 61/168* (2013.01); *B23P 11/02* (2013.01); *F02M 61/10* (2013.01); *F02M 2200/8061* (2013.01)

(58) Field of Classification Search
CPC ................ F02M 61/168; F02M 61/10; F02M 2200/8061; F02M 2200/858;
(Continued)

(56) References Cited

U.S. PATENT DOCUMENTS

2007/0095745 A1* 5/2007 Sebastian ........... F02M 51/0682 239/584
2009/0229576 A1* 9/2009 Biasci .................. F02M 55/025 285/80
2017/0260952 A1 9/2017 Nakai et al.

FOREIGN PATENT DOCUMENTS

JP 5-304434 A 11/1993
JP 2012-108367 A 6/2012
WO WO 2016/042896 A1 3/2016

OTHER PUBLICATIONS

International Preliminary Report on Patentability (PCT/IB/338 & PCT/IB/373) issued in PCT Application No. PCT/JP2021/018838 dated Jan. 26, 2023, Including English translation of document C2 (Japanese-language Written Opinion (PCT/ISA/237), filed on Dec. 15, 2022) (seven (7) pages).
(Continued)

*Primary Examiner* — Christopher R Dandridge
(74) *Attorney, Agent, or Firm* — Crowell & Moring LLP

(57) ABSTRACT

A method for manufacturing a coupling body includes a press-fitting step of press-fitting a coupling shaft-shaped portion of a valve member into a pit portion of a cap. A peripheral surface of a high-hardness component having a relatively high hardness of an outer peripheral surface of the coupling shaft-shaped portion of the valve member and an inner peripheral surface of the pit portion of the cap includes: a first-stage cylindrical surface having a diameter difference with respect to a peripheral surface of a low-hardness component; and a second-stage cylindrical surface positioned closer to a rear side in a press-fitting direction
(Continued)

than the first-stage cylindrical outer peripheral surface and protruding in a radial direction to form a step with respect to the first-stage cylindrical surface. The press-fitting step includes: a first stage at which the peripheral surface of the low-hardness component is deformed in a plastic region by the first-stage cylindrical surface; and a second stage at which the peripheral surface subjected to the deformation in the plastic region is deformed by the second-stage cylindrical surface in an amount smaller than the deformation amount at the first stage.

4 Claims, 13 Drawing Sheets

(58) Field of Classification Search
CPC ..... F02M 2200/057; F02M 2200/8053; F02M 51/0682
See application file for complete search history.

(56) References Cited

OTHER PUBLICATIONS

International Search Report (PCT/ISA/210) issued in PCT Application No. PCT/JP2021/018838 dated Jun. 22, 2021 with English translation (four (4) pages).
Japanese-language Written Opinion (PCT/ISA/237) issued in PCT Application No. PCT/JP2021/018838 dated Jun. 22, 2021 (five (5) pages).

* cited by examiner

COMPARATIVE EXAMPLE

COMPARATIVE EXAMPLE

COUPLING BODY, FUEL INJECTION VALVE INCLUDING COUPLING BODY, AND METHOD FOR MANUFACTURING COUPLING BODY

TECHNICAL FIELD

The present invention relates to a coupling body, a fuel injection valve including the coupling body, and a method for manufacturing the coupling body, and more particularly, to a coupling body in which a component having a rod-shaped portion and a component having a pit portion are coupled to each other by press-fitting, a fuel injection valve including the coupling body, and a method for manufacturing the coupling body in which coupling is performed by press-fitting.

BACKGROUND ART

A fuel injection valve used in an internal combustion engine may include a coupling body in which a rod-shaped portion of one component is press-fitted into a pit portion of another component to couple the two components to each other (see, for example, PTL 1). In the fuel injection valve described in PTL 1, a protruding portion (a rod-shaped portion) is provided at an end portion of the valve member opposite to a valve body, and a bottomed tubular cap is attached to the protruding portion of the valve member. By press-fitting the protruding portion of the valve member into an internal space (the pit portion) of the tubular portion of the cap, a coupling body in which the cap and the valve member are coupled to each other is formed.

CITATION LIST

Patent Literature

PTL 1: WO 2016/042896 A

SUMMARY OF INVENTION

Technical Problem

In the fuel injection valve as described in PTL 1, an outer diameter of the protruding portion (the rod-shaped portion) of the valve member and an inner diameter of the tubular portion (the pit portion) of the cap may be small diameters of several millimeters. In a case where two small-diameter components are coupled to each other by press fitting, when the two components are to be coupled to each other by elastic deformation, a fastening allowance between the two components is in an extremely narrow range of several micrometers. However, it is difficult to set dimensional tolerances of the two components according to such a narrow fastening allowance range, from the viewpoint of processing accuracy of machine tool and manufacturing cost. In addition, since a fastening allowance between the two components is generally defined by a diameter difference between an outer diameter and an inner diameter of the two components, the fastening allowance varies depending on a dimensional tolerance of each component. In this case, there is a concern that the coupling strength of the coupling body may vary.

On the other hand, when the fastening allowance between the two components is set to be large from the viewpoint of processing accuracy of machine tool and manufacturing cost, there is a problem that galling is likely to occur in a press-fitting portion between the two components. If galling occurs at the time of press-fitting the two components, there is a concern that the coupling strength of the coupling body may deteriorate.

The present invention has been made to solve the above-described problems, and an object of the present invention is to provide a coupling body capable of reducing a variation in coupling strength without increasing accuracy in processing the components, a fuel injection valve including the coupling body, and a method for manufacturing the coupling body.

Solution to Problem

According to one of preferred modes of the invention for solving the aforementioned problems, a method for manufacturing a coupling body in which a first component and a second component are coupled to each other includes: a first forming step of forming a rod-shaped portion in the first component; a second forming step of forming a pit portion in the second component; and a press-fitting step of press-fitting the rod-shaped portion of the first component into the pit portion of the second component, wherein a peripheral surface of a high-hardness component having a relatively high hardness of an outer peripheral surface of the rod-shaped portion of the first component or an inner peripheral surface of the pit portion of the second component includes: a first-stage cylindrical surface having a diameter difference with respect to a peripheral surface of a low-hardness component having a relatively low hardness; and a second-stage cylindrical surface positioned closer to a rear side in a press-fitting direction than the first-stage cylindrical surface and protruding in a radial direction to form a step with respect to the first-stage cylindrical surface, and the press-fitting step includes: a first stage at which the peripheral surface of the low-hardness component is deformed in a plastic region by the first-stage cylindrical surface of the high-hardness component; and a second stage at which the peripheral surface of the low-hardness component subjected to the deformation in the plastic region is deformed by the second-stage cylindrical surface of the high-hardness component in an amount smaller than the deformation amount at the first stage.

Advantageous Effects of Invention

According to the present invention, the two components are coupled to each other through the first stage at which the peripheral surface of the low-hardness component is plastically deformed by the first-stage cylindrical surface of the high-hardness component to be formed to have the same dimension as the diameter of the first-stage cylindrical surface, and then, the second stage at which the peripheral surface of the low-hardness component is further deformed by the second-stage cylindrical surface of the high-hardness component in an amount smaller than the deformation amount at the first stage. Therefore, a fastening allowance (a press-fitting allowance) for achieving coupling through the second-stage deformation is determined by a step (a difference in diameter) between the first-stage cylindrical surface and the second-stage cylindrical surface of the high-hardness component, not by a difference in diameter between the two components, the high-hardness component and the low-hardness component. Therefore, the fastening allowance (the press-fitting allowance) varies within a processing accuracy (dimensional tolerance) range of the high-hardness component, but is not affected by accuracy (dimensional tolerance) in processing the two components. Therefore, it is possible to reduce a variation in coupling strength without increasing accuracy in processing the two components.

Other problems, configurations, and effects that are not described above will be apparent from the following description of embodiments.

DESCRIPTION OF EMBODIMENTS

Hereinafter, a coupling body, a fuel injection valve including the coupling body, and a method for manufacturing the coupling body according to an embodiment of the present invention will be described with reference to the drawings. The present embodiment will be described using an example applied to an electromagnetic fuel injection valve that electromagnetically drives a valve member.

First Embodiment

Figure 1:
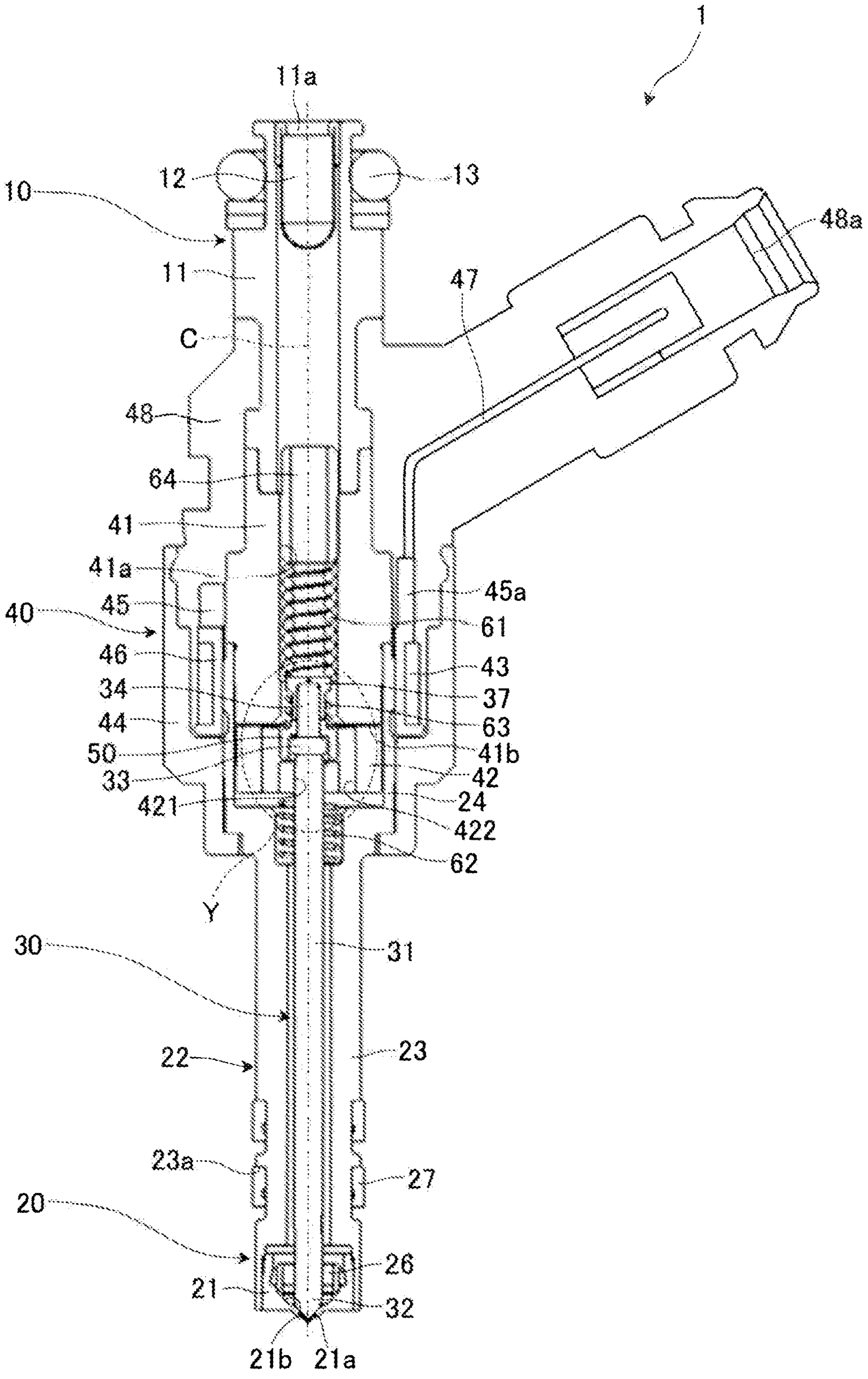
FIG. 1 is a longitudinal cross-sectional view illustrating a structure of a fuel injection valve including a coupling body according to a first embodiment of the present invention.

First, a configuration of a fuel injection valve including a coupling body according to a first embodiment of the present invention will be described with reference to FIG. 1. FIG. 1 is a longitudinal cross-sectional view illustrating a structure of a fuel injection valve including a coupling body according to the first embodiment of the present invention. In the following description, a vertical direction is defined on the basis of FIG. 1. This vertical direction does not necessarily coincide with a vertical direction of the fuel injection valve in a mounted state.

In FIG. 1, a fuel injection valve 1 is an electromagnetic fuel injection valve that electromagnetically drives a valve member 30 for fuel injection. Specifically, the fuel injection valve 1 includes a fuel introduction mechanism 10 that introduces fuel into the fuel injection valve 1, a nozzle mechanism 20 that injects the introduced fuel, a valve member 30 capable of allowing and blocking the fuel injection of the nozzle mechanism 20, and an electromagnetic drive mechanism 40 that electromagnetically drives the valve member 30. In the fuel injection valve 1, a fuel pipe arrangement (not illustrated) is connected to the fuel introduction mechanism 10, and the nozzle mechanism 20 is inserted and attached into an attachment pit of an intake pipe or a combustion chamber forming member (a cylinder block, a cylinder head, or the like) of an internal combustion engine (not illustrated). The fuel injection valve 1 injects the fuel, which is introduced from the fuel pipe arrangement into the fuel introduction mechanism 10, from the nozzle mechanism 20 into the intake pipe or the combustion chamber. The fuel injection valve 1 has a central axis line C, and is configured in such a manner that the fuel flows substantially along a direction in which the central axis line C extends (the vertical direction in FIG. 1).

The fuel introduction mechanism 10 includes a fuel pipe 11 extending along the central axis line C, with the inside of the fuel pipe 11 constituting a part of a fuel passage, and a filter 12 disposed inside the fuel pipe 11. The fuel pipe 11 has a fuel introduction port 11*a* through which fuel is introduced at one end thereof (at the upper end portion in FIG. 1). The filter 12 filters foreign matters mixed in the fuel in the fuel introduction port 11*a*. A seal member 13 is provided on an outer peripheral portion of the fuel pipe 11 on the fuel introduction port 11*a* side. The seal member 13 prevents fuel leakage from a portion connected to the fuel pipe arrangement when the fuel pipe 11 is attached to the fuel pipe arrangement, and is formed of, for example, an O-ring. The other end portion (the lower end portion in FIG. 1) of the fuel pipe 11 is attached to a fixed core 41, which will be described below, of the electromagnetic drive mechanism 40.

The nozzle mechanism 20 includes a nozzle member 21 having a fuel injection hole 21*a* (see FIG. 2 as well) for injecting fuel, and a nozzle holder 22 holding the nozzle member 21. The nozzle holder 22 is connected to the fuel pipe 11 via the fixed core 41, which will be described below, of the electromagnetic drive mechanism 40, and is a tubular body extending in the same direction as the extending direction of the fuel pipe 11 (along the central axis line C). The inside of the nozzle holder 22 functions as a part of the fuel passage, and is configured to accommodate the valve member 30 and some members of the electromagnetic drive mechanism 40. The nozzle holder 22 includes a small-diameter tubular portion 23 having a relatively small outer diameter and a large-diameter tubular portion 24 having a larger outer diameter than the small-diameter tubular portion 23. Most of the valve member 30 is disposed inside the small-diameter tubular portion 23, and a part of the valve member 30 and members such as a movable core 42, which will be described below, of the electromagnetic drive mechanism 40 and a gap forming member 50 are disposed inside the large-diameter tubular portion 24.

The nozzle member 21 is fixed inside a distal end portion of the small-diameter tubular portion 23 in an inserted state. The nozzle member 21 is formed of, for example, a member called an orifice cup formed in a cup shape, and has a conical valve seat 21*b* (see FIG. 2 as well) on an inner surface side thereof. An outer peripheral end of a distal end surface of the orifice cup 21 and an opened end of the distal end portion of the small-diameter tubular portion 23 are welded to each other to seal a joint portion between the orifice cup 21 and the small-diameter tubular portion 23. A guide member 26 is fixed inside the orifice cup 21 by press fitting or plastic coupling. The guide member 26 guides a movement of the valve member 30 in a valve opening/closing direction (a direction along the central axis line C), and is configured to slidably contact an outer peripheral surface of the valve member 30. An annular groove 23*a* is provided in an outer peripheral portion of the small-diameter tubular portion 23 on the nozzle member 21 side. A seal member 27 is fitted into the groove 23*a*. The seal member 27 maintains airtightness when the fuel injection valve 1 is mounted on the internal combustion engine, and for example, a chip seal made of a resin is used therefor.

The valve member 30 is disposed inside the nozzle holder 22 to be movable in an approaching/separating direction (the vertical direction in FIG. 1) with respect to the valve seat 21*b*. The valve member 30 includes a valve rod portion 31 extending in the approaching/separating direction with respect to the valve seat 21*b* (in an extending direction of the central axis line C), a valve body 32 provided at one end portion (a lower end portion in FIG. 1) of the valve rod portion 31 on the valve seat 21*b* side, a flange portion 33 provided at the other end portion (an upper end portion in FIG. 1) of the valve rod portion 31 on the opposite side of the valve body 32 and protruding in a radial direction further than the valve rod portion 31, and a protruding portion 34 extending from the flange portion 33 in an opposite direction to the valve rod portion 31. The valve body 32 is configured to be seated on and unseated from the valve seat 21*b* of the orifice cup 21. When the valve body 32 abuts on (is seated on) the valve seat 21*b*, the flow of fuel to the fuel injection hole 21*a* is blocked. On the other hand, when the valve body 32 is separated (unseated) from the valve seat 21*b*, the flow of fuel to the fuel injection hole 21*a* is allowed. The flange portion 33 is a portion that functions as an engagement portion to be engaged with the movable core 42, which will be described below, of the electromagnetic drive mechanism 40. The valve member 30 is guided to reciprocate in the valve opening/closing direction (in the extending direction of the central axis line C) by the guide member 26 disposed on the valve body 32 side (the orifice cup 21 side) and the movable core 42 disposed on the flange portion 33 side. A cap 37 is coupled to a distal end portion of the protruding portion 34 of the valve member 30 by press-fitting. The cap 37 is a component constituting a spring seat for a first biasing spring 61 and a spring seat for a third biasing spring 63, which will be described below, of the electromagnetic drive mechanism 40. The valve member 30 and the cap 37 constitute a part of a movable portion that is movable in the nozzle holder 22. Structures of the valve member 30 and the cap 37 constituting the movable portion will be described in detail below.

The electromagnetic drive mechanism 40 includes a fixed core 41 attached into an opening of the large-diameter tubular portion 24 of the nozzle holder 22, a movable core 42 movably disposed inside the large-diameter tubular portion 24, an annular or tubular electromagnetic coil 43 disposed on outer peripheral sides of the fixed core 41 and the large-diameter tubular portion 24, and a housing 44 surrounding outer peripheral portions of the large-diameter tubular portion 24 and the electromagnetic coil 43 and functioning as a yoke. An annular magnetic passage surrounding the electromagnetic coil 43 is formed by the large-diameter tubular portion 24 of the nozzle holder 22, the fixed core 41, the movable core 42, and the housing 44.

An outer peripheral portion of one end portion (a lower end portion in FIG. 1) of the fixed core 41 is press-fitted into an inner peripheral portion of the large-diameter tubular portion 24 of the nozzle holder 22, and the fixed core 41 and the large-diameter tubular portion 24 are welded to each other at a contact position. A gap between an outer peripheral surface of the fixed core 41 and an inner peripheral surface of the large-diameter tubular portion 24 of the nozzle holder 22 is sealed by the welding. The fixed core 41 has a through hole 41*a* extending along the central axis line C in a central portion thereof. The through hole 41*a* of the fixed core 41 communicates with the fuel introduction port 11*a* of the fuel pipe 11 and the internal space of the nozzle holder 22, and constitutes a part of the fuel passage. The through hole 41*a* is formed to allow the valve member 30 (a coupling body to be described below) to which the cap 37 is attached to be inserted thereinto. That is, an inner diameter of the through hole 41*a* is set to be larger than an outer diameter of the cap 37. A C-shaped core member 45, which includes a missing portion as compared to annular shape, is fitted onto an outer peripheral portion of the fixed core 41 closer to the fuel introduction port 11*a* than the electromagnetic coil 43. The fixed core 41 is a member for exerting a magnetic attraction force between the fixed core 41 and the movable core 42, and has an end surface 41*b* (a lower end surface in FIG. 1) facing the movable core 42.

The movable core 42 is a member positioned closer to the nozzle member 21 than the fixed core 41, and attracted toward the fixed core 41 due to the action of the magnetic attraction force. An outer peripheral surface of the movable core 42 slides on the inner peripheral surface of the large-diameter tubular portion 24 of the nozzle holder 22, so that a movement of the movable core 42 is guided in the valve opening/closing direction (in the extending direction of the large-diameter tubular portion 24). That is, the large-diameter tubular portion 24 functions as a guide that guides a movement of the movable core 42. The movable core 42 has an insertion hole 421 in a central portion thereof to allow the valve rod portion 31 of the valve member 30 to be inserted thereinto, and is configured to be relatively movable with respect to the valve member 30. That is, the inner peripheral surface forming the insertion hole 421 of the movable core 42 is configured to be slidable on an outer peripheral surface of the valve rod portion 31, and has a function as guide that guides a movement of the valve member 30. The movable core 42 has a through hole 422 constituting the fuel passage around the insertion hole 421. The movable core 42 is configured to be engaged with the flange portion 33 of the valve member 30 from the valve body 32 side (the lower side in FIG. 1). Together with the valve member 30, the movable core 42 constitutes the movable portion that is movable in the nozzle holder 22. A structure of the movable core 42 constituting the movable portion will be described in detail below.

The electromagnetic coil 43 is wound around an annular bobbin 46 having a U-shaped cross section and open outward in the radial direction. A conductor portion 47 having high rigidity is attached to both end portions of the electromagnetic coil 43. The conductor portion 47 is drawn out from a pit portion 45*a* provided in a space corresponding to the missing portion of the core member 45 fitted onto the outer periphery of the fixed core 41.

The housing 44 is formed in a tubular shape, and is fitted in a state where the large-diameter tubular portion 24 of the nozzle holder 22 is located therein. Inside the housing 44, most of the fixed core 41 and the electromagnetic coil 43 are disposed with a gap from an inner peripheral surface of the housing 44. Together with the small-diameter tubular portion 23 of the nozzle holder 22, the housing 44 constitutes a part of an outline of the fuel injection valve 1.

The outer peripheral sides of the electromagnetic coil 43, the fixed core 41, and a portion of the fuel pipe 11 on the fixed core 41 side are covered with a resin cover 48. The resin cover 48 is molded by injecting an insulating resin from an opening of the housing 44 on the fuel introduction port 11*a* side. The resin cover 48 includes a connector 48*a* connectable to a plug for supplying power from a high-voltage power supply or a battery power supply. The conductor portion 47 is mostly embedded in the resin cover 48, but is partially exposed to a place where the connector 48*a* is positioned.

In the large-diameter tubular portion 24 of the nozzle holder 22, the gap forming member 50 is disposed to be able to abut on the flange portion 33 (the engagement portion) of the valve member 30 and the movable core 42 and to be relatively movable in the valve opening/closing direction (in extending direction of the central axis line C) with respect to the valve member 30 and the movable core 42. The gap forming member 50 is a member that forms a gap G1 (see FIG. 2) in the valve opening/closing direction (in the extending direction of the central axis line C) defining a pre-stroke between the flange portion 33 (the engagement portion) of the valve member 30 and the movable core 42 in a valve-closed state. The pre-stroke indicates that the movable core 42 moves in a valve opening direction, while the valve body 32 of the valve member 30 remains in the valve-closed state, at the time of the valve opening operation. Together with the valve member 30 and the movable core 42, the gap forming member 50 constitutes the movable portion that is movable in the nozzle holder 22. A structure of the gap forming member 50 constituting the movable portion will be described in detail below.

Inside the through hole 41*a* of the fixed core 41, the first biasing spring 61 is disposed at a position closer to the fuel introduction port 11*a* (the upper side in FIG. 1) than the valve member 30, and an adjuster 64 is fixed by press fitting at a position closer to the fuel introduction port 11*a* than the first biasing spring. The first biasing spring 61 biases the valve member 30 in a valve closing direction (in the downward direction in FIG. 1). One end portion (a lower end portion in FIG. 1) of the first biasing spring 61 abuts on the cap 37 attached to the protruding portion 34 of the valve member 30, and the other end portion (an upper end portion in FIG. 1) of the first biasing spring 61 is supported by the adjuster 64. The adjuster 64 is configured such that its position is adjustable in the through hole 41*a* of the fixed core 41 to adjust a biasing force of the first biasing spring 61 against the valve member 30 in the valve-closed state. One end portion (a lower end portion in FIG. 1) of the adjuster 64 constitutes a spring seat for the other end side of the first biasing spring 61.

Inside the large-diameter tubular portion 24 of the nozzle holder 22, a second biasing spring 62 is disposed at a position closer to the nozzle member 21 than the movable core 42. The second biasing spring 62 biases the valve member 30 in the valve opening direction (in the upward direction in FIG. 1) via the movable core 42. One end portion (a lower end portion in FIG. 1) of the second biasing spring 62 is supported by an inner portion of the large-diameter tubular portion 24, and the other end portion (an upper end portion in FIG. 1) of the second biasing spring 62 abuts on the movable core 42.

The third biasing spring 63 is disposed between the cap 37 and the gap forming member 50. The third biasing spring 63 biases the gap forming member 50 toward the movable core 42. One end portion (a lower end portion in FIG. 1) of the third biasing spring 63 abuts on the gap forming member 50 and the other end portion (an upper end portion in FIG. 1) of the third biasing spring 63 abuts on the cap 37.

The biasing forces of the above-described three biasing springs 61, 62, and 63 descent in the following order: the first biasing spring 61, the third biasing spring 63, and the second biasing spring 62.

Figure 2:
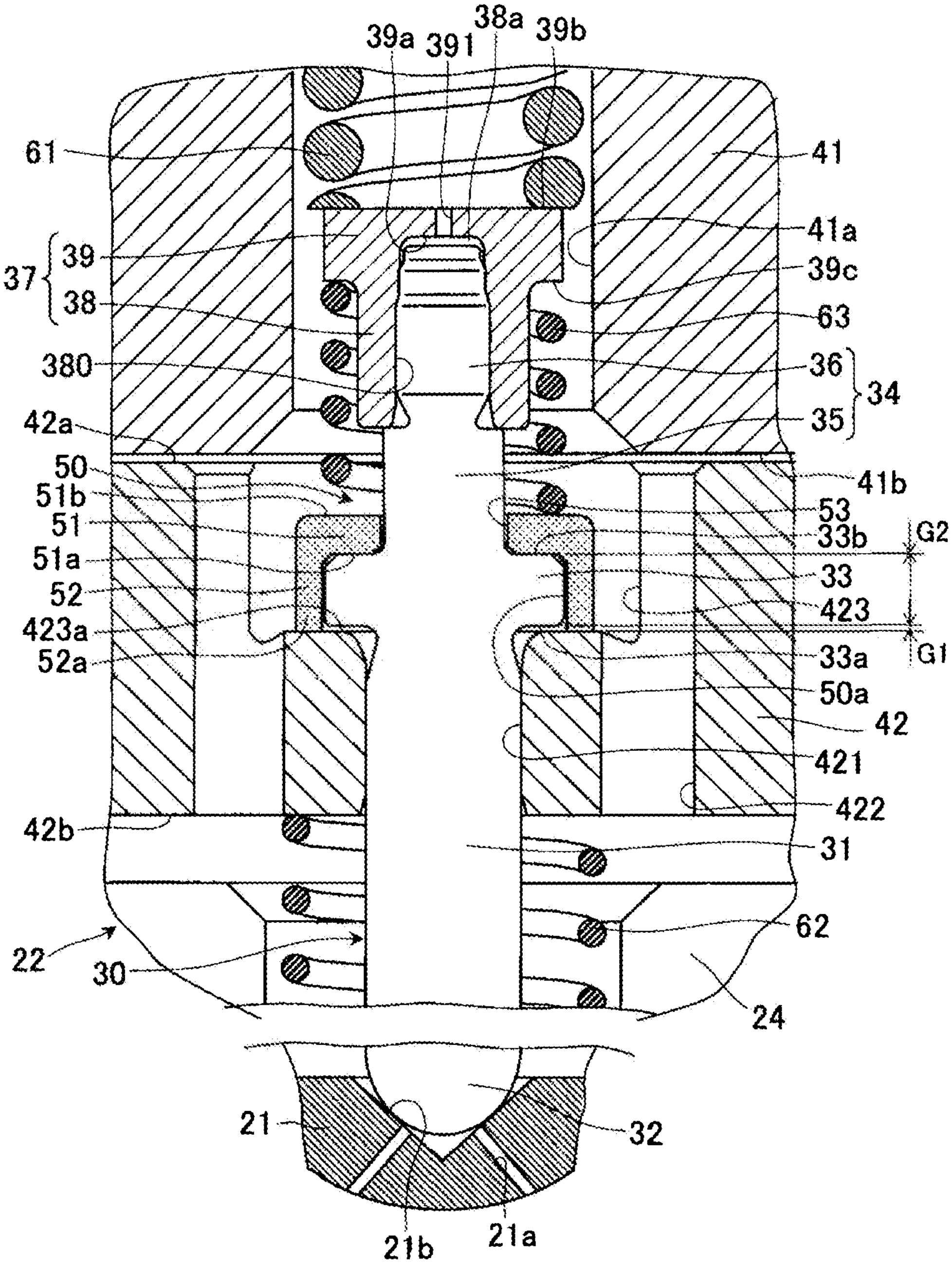
FIG. 2 is a cross-sectional view illustrating a part of the fuel injection valve indicated by reference sign Y in FIG. 1 in an enlarged state.

Next, a structure of each of the components (the valve member and the cap of coupling body, the movable core, and the gap forming member) constituting the movable portion of the fuel injection valve will be described in detail with reference to FIG. 2. FIG. 2 is a cross-sectional view illustrating a part of the fuel injection valve indicated by reference sign Y in FIG. 1 in an enlarged state. FIG. 2 illustrates the valve member in a valve-closed state and the movable core in a stationary state.

In FIG. 2, the valve member 30 is formed by integrally molding the valve body 32, the valve rod portion 31, the flange portion 33, and the protruding portion 34 as described above. The valve body 32 blocks the flow of fuel to the fuel injection hole 21*a* when a distal end surface of the valve body 32 abuts on the valve seat 21*b* of the nozzle member 21. The valve rod portion 31 is inserted into the insertion hole 421 of the movable core 42, and the outer peripheral surface of the valve rod portion 31 is configured to be slidable on the inner peripheral surface of the insertion hole 421. That is, a movement of the valve rod portion 31 is guided by the movable core 42. The flange portion 33 is formed to have an outer diameter larger than a hole diameter of the insertion hole 421 of the movable core 42, and functions as an engagement portion to be engaged with the movable core 42. The flange portion 33 has an annular engagement surface 33*a* (a lower end surface in FIG. 2) facing the valve body 32 (the lower side in FIG. 1) and capable of engaging with the movable core 42, and an annular abutment surface 33*b* (an upper end surface in FIG. 2) facing the opposite side to the engagement surface 33*a* (the upper side in FIG. 1) and capable of abutting on the gap forming member 50. The protruding portion 34 is a portion including a sliding shaft-shaped portion 35 positioned on the flange portion 33 side and sliding on the gap forming member 50, and a coupling shaft-shaped portion 36 positioned closer to a distal end side of the protruding portion 34 than the sliding shaft-shaped portion 35 and coupled to the cap 37, and having a length capable of disposing the third biasing spring 63 thereon.

The cap 37 is configured to be disposed inside the through hole 41*a* of the fixed core 41. For example, the cap 37 includes a tubular portion 38 fitted onto the coupling shaft-shaped portion 36 of the protruding portion 34 of the valve member 30, and a bottom portion 39 closing an opening of the tubular portion 38 on the fuel introduction port 11*a* (see FIG. 1) side (the upper side in FIG. 2) and protruding in the radial direction further outward than the tubular portion 38. An internal space of the tubular portion 38 constitutes a pit portion 38*a* into which the coupling shaft-shaped portion 36 of the protruding portion 34 is press-fitted, and an inner peripheral surface of the tubular portion 38 constitutes an inner peripheral surface 380 of the pit portion 38*a*.

The bottom portion 39 of the cap 37 has a through hole 391 penetrating through the bottom portion 39 to communicate the inside and the outside of the cap 37. The through hole 391 functions as a hole for bleeding air when the cap 37 is press-fitted onto the coupling shaft-shaped portion 36 of the valve member 30, and facilitates an operation for press-fitting the cap 37 onto the coupling shaft-shaped portion 36.

A first outer surface 39*b* of the bottom portion 39 of the cap 37 facing the fuel introduction port 11*a* (the upper side in FIG. 2) constitutes a spring seat for one side of the first biasing spring 61. A second outer surface 39*c* of the bottom portion 39 having an annular shape and facing the opposite side to the first outer surface 39*b* constitutes a spring seat for the other side of the third biasing spring 63. That is, the cap 37 receives a biasing force of the first biasing spring 61 toward the valve body 32 (in the valve closing direction), while receiving a biasing force of the third biasing spring 63 toward the fuel introduction port 11*a* (in the valve opening direction). As described above, since the biasing force of the first biasing spring 61 is larger than the biasing force of the third biasing spring 63, the cap 37 is normally pressed against the protruding portion 34 due to a difference between the biasing forces of the first biasing spring 61 and the third biasing spring 63.

By press-fitting the coupling shaft-shaped portion 36 of the valve member 30 (a first component) into the pit portion 38*a* of the cap 37 (a second component), a coupling body in which the valve member 30 (the first component) and the cap 37 (the second component) are coupled to each other is formed. A structure of the coupling body and a method for manufacturing the coupling body will be described in detail below.

The movable core 42 has a first end surface 42*a* (an upper end surface in FIG. 2) facing the fixed core 41 (the upper side in FIG. 2) and a second end surface 42*b* (a lower end surface in FIG. 2) facing the opposite side to the first end surface 42*a* (the lower side in FIG. 2). The movable core 42 is configured such that the first end surface 42*a* thereof faces the end surface 41*b* (the lower end surface in FIG. 2) of the fixed core 41 on the nozzle member 21 side (the lower side in FIG. 2). When the valve member 30 is in the valve-closed state, the first end surface 42*a* of the movable core 42 faces the end surface 41*b* of the fixed core 41 with a gap. The movable core 42 is configured such that the first end surface 42*a* collides with the end surface 41*b* of the fixed core 41 when attracted toward the fixed core 41 by an electromagnetic attraction force. The second end surface 42*b* of the movable core 42 is a portion on which the other end portion (an upper end portion in FIG. 2) of the second biasing spring 62 abuts, and constitutes a spring seat for the second biasing spring 62. The second end surface 42*b* faces a step surface between the large-diameter tubular portion 24 and the small-diameter tubular portion 23 of the nozzle holder 22, but does not come into contact with the step surface because the second biasing spring 62 is interposed between the second end surface 42*b* and the large-diameter tubular portion 24 (see FIG.

In a middle portion of the movable core 42 on the first end surface 42*a* side, a recess 423 opened, for example, toward the fixed core 41 is formed. The recess 423 has an inner diameter and a height capable of housing the flange portion 33 of the valve member 30 and the gap forming member 50 entirely. A bottom surface 423*a* of the recess 423 is a portion that can be engaged with the engagement surface 33*a* (the lower end surface in FIG. 2) of the flange portion 33 of the valve member 30 and can abut on a distal end portion 52*a* of a peripheral wall portion 52, which will be described below, of the gap forming member 50.

The insertion hole 421 of the movable core 42 is a hole penetrating from the bottom surface 423*a* of the recess 423 to the second end surface 42*b*. The insertion hole 421 has a hole diameter smaller than the outer diameter of the flange portion 33 of the valve rod portion 31, and is set to have a size that allows the valve rod portion 31 to slide therein. That is, the inner peripheral surface forming the insertion hole 421 of the movable core 42 constitutes a sliding surface on which the outer peripheral surface of the valve rod portion 31 slides. When the bottom surface 423*a* of the recess 423 is engaged with the engagement surface 33*a* of the flange portion 33 of the valve member 30, the movable core 42 moves in cooperation with the valve member 30 at the time of the valve opening operation for shifting from the valve-closed state to the valve-opened state or at the time of the valve closing operation for shifting from the valve-opened state to the valve-closed state. When a force for moving the movable core 42 downward or a force for moving the valve member 30 upward acts independently, the movable core 42 moves to be relatively displaced with respect to the valve member 30.

The gap forming member 50 is a bottomed tubular body having an internal space 50*a* capable of housing the flange portion 33 of the valve member 30 entirely. The gap forming member 50 includes a bottom portion 51 having a bottom surface 51*a* that can abut on the abutment surface 33*b* (the upper end surface in FIG. 2) of the flange portion 33 of the valve member 30, and a peripheral wall portion 52 rising from an outer peripheral edge portion of the bottom portion 51 and open toward the movable core 42 (the lower side in FIG. 2). An outer surface 51*b* (an upper surface in FIG. 2)

of the bottom portion 51 is a portion on which one end portion (the lower end portion in FIG. 2) of the third biasing spring 63 abuts, and constitutes a spring seat for one side of the third biasing spring 63. In the gap forming member 50, an opening of the peripheral wall portion 52 faces the movable core 42, and the open-side end portion (the distal end portion) 52*a* of the peripheral wall portion 52 is an abutment portion that can about on the bottom surface 423*a* of the recess 423 of the movable core 42. An insertion hole 53 is formed in the bottom portion 51. The insertion hole 53 is a portion through which the sliding shaft-shaped portion 35 of the protruding portion 34 of the valve member 30 is slidably inserted, and an inner diameter thereof is set to be smaller than an outer diameter of the flange portion 33 of the valve member 30.

In a state where the gap forming member 50 is placed on the abutment surface 33*b* (at a reference position) of the flange portion 33 of the valve member 30, the open-side end portion 52*a* (the abutment portion) of the peripheral wall portion 52 abuts on the movable core 42, thereby forming a gap G1 defining a pre-stroke between the engagement surface 33*a* (the engagement portion) of the flange portion 33 of the valve member 30 and the bottom surface 423*a* (the engagement portion) of the recess 423 of the movable core 42. When the movable core 42 is displaced toward the fixed core 41 from the state illustrated in FIG. 2 until the gap G1 becomes 0, the valve member 30 is not displaced and the valve-closed state is maintained.

As illustrated in FIG. 2, when the movable core 42 is in a stationary state while the valve member 30 is in the valve-closed state, the gap forming member 50 receives a biasing force of the third biasing spring 63 in the valve closing direction, such that the bottom surface 51*a* abuts on the abutment surface 33*b* (the reference position) of the flange portion 33 of the valve member 30 to be positioned at the reference position (on the abutment surface 33*b* of the flange portion 33) of the valve member 30. That is, a size (dimension) of a gap G2 between the bottom surface 51*a* of the gap forming member 50 and the abutment surface 33*b* of the flange portion 33 of the valve member 30 is 0. Meanwhile, the movable core 42 receives a biasing force of the second biasing spring 62, and the bottom surface 423*a* of the recess 423 of the insertion hole 421 abuts on the open-side end portion (the distal end portion) 52*a* of the peripheral wall portion 52 of the gap forming member 50. At this time, since the biasing force of the second biasing spring 62 is smaller than the biasing force of the third biasing spring 63 and the height dimension of the internal space 50*a* of the gap forming member 50 is larger than the height dimension of the flange portion 33 of the valve member 30, the movable core 42 cannot push back the gap forming member 50 biased by the third biasing spring 63, and the bottom surface 423*a* of the movable core 42 is not engaged with the engagement surface 33*a* of the flange portion 33 of the valve member 30. That is, a size of the gap G1 between the bottom surface 423*a* of the movable core 42 and the engagement surface 33*a* of the flange portion 33 of the valve member 30 corresponds to a pre-stroke amount.

Figure 3:
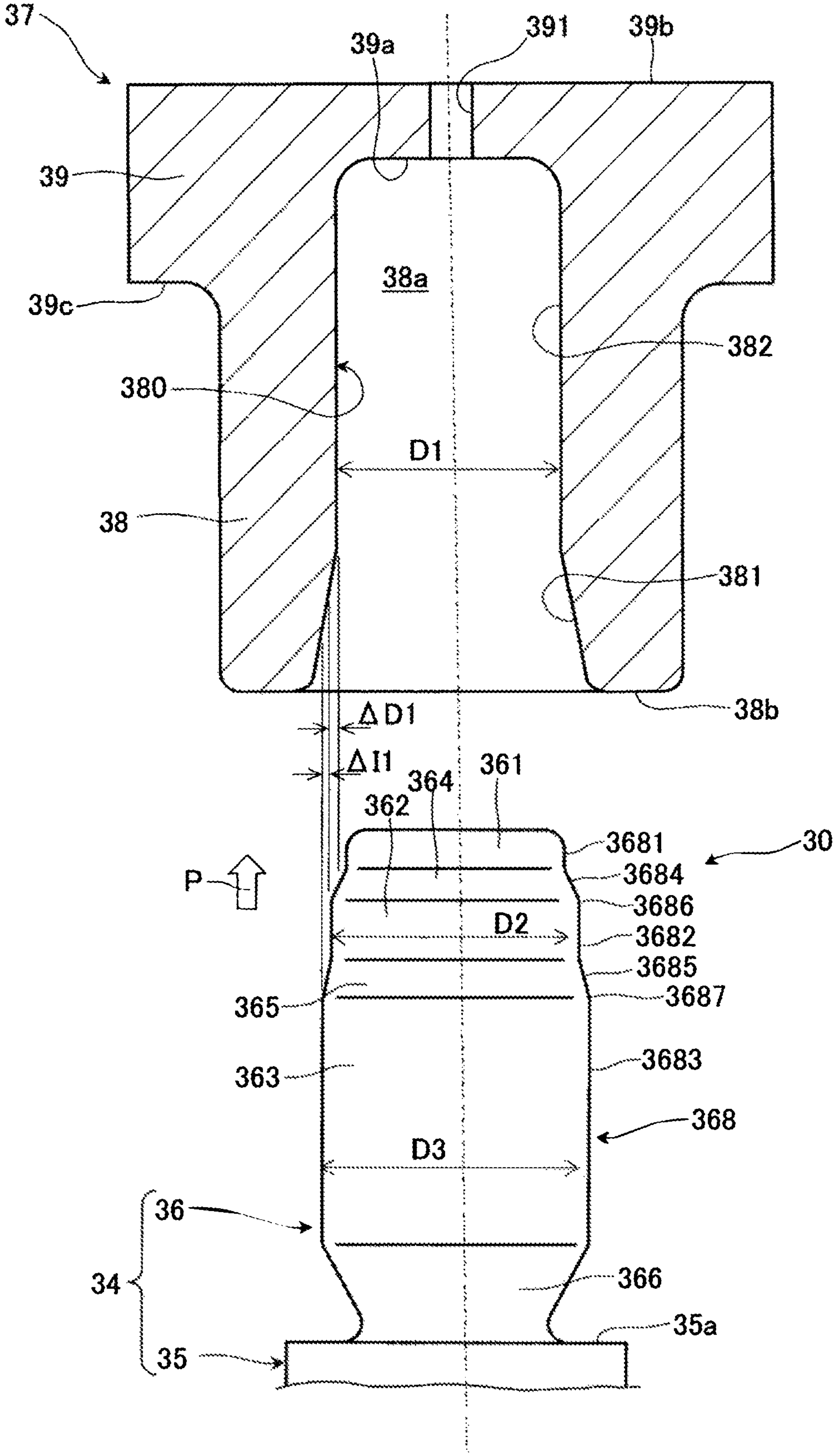
FIG. 3 is a cross-sectional view illustrating structures of two components (a valve member and a cap), which constitute the coupling body, before coupled (before press-fitted) according to the first embodiment of the present invention.
Figure 4:
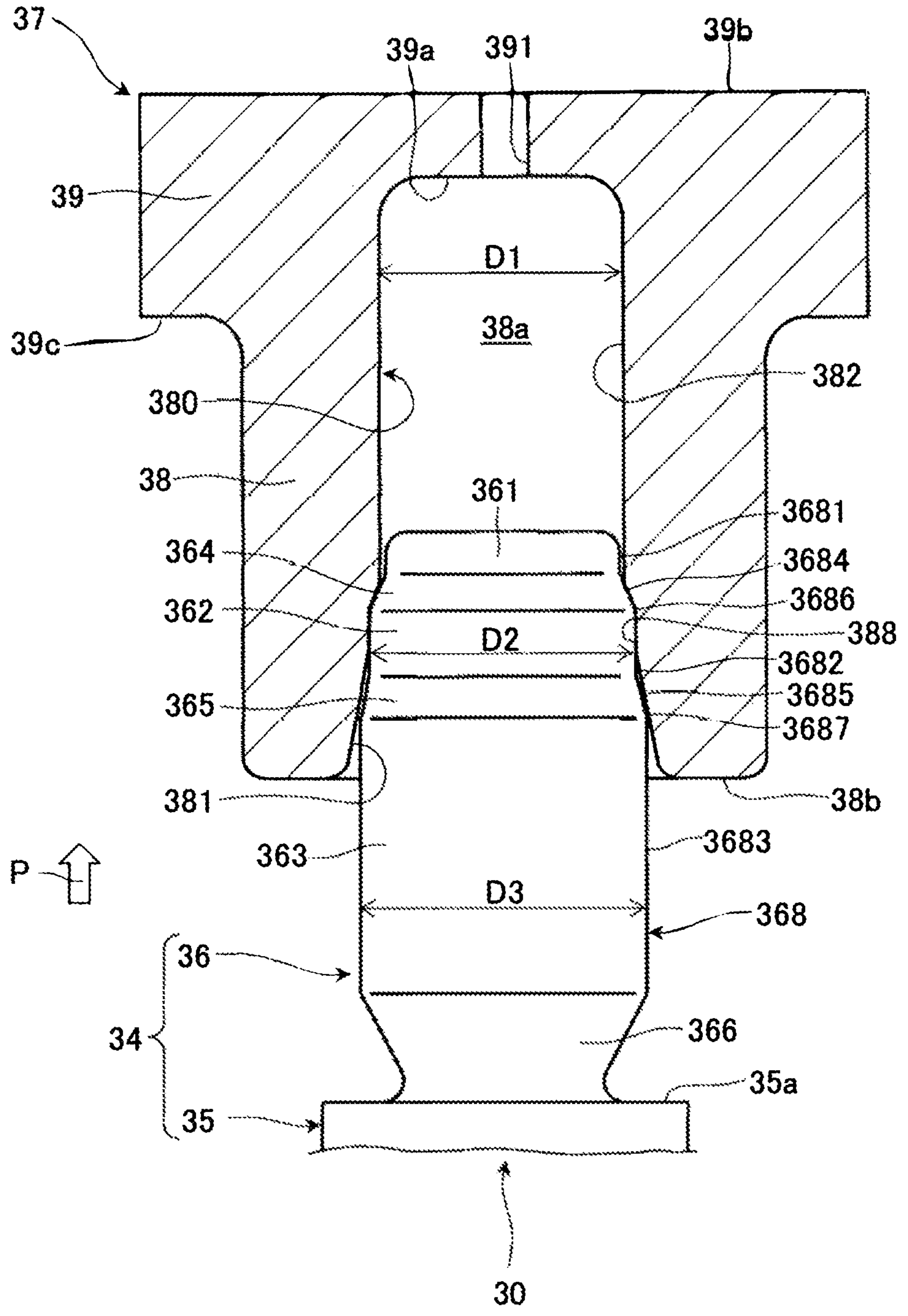
FIG. 4 is a cross-sectional view illustrating states of the two components (the valve member and the cap) constituting the coupling body according to the first embodiment of the present invention illustrated in FIG. 3 while being press-fitted.
Figure 5:
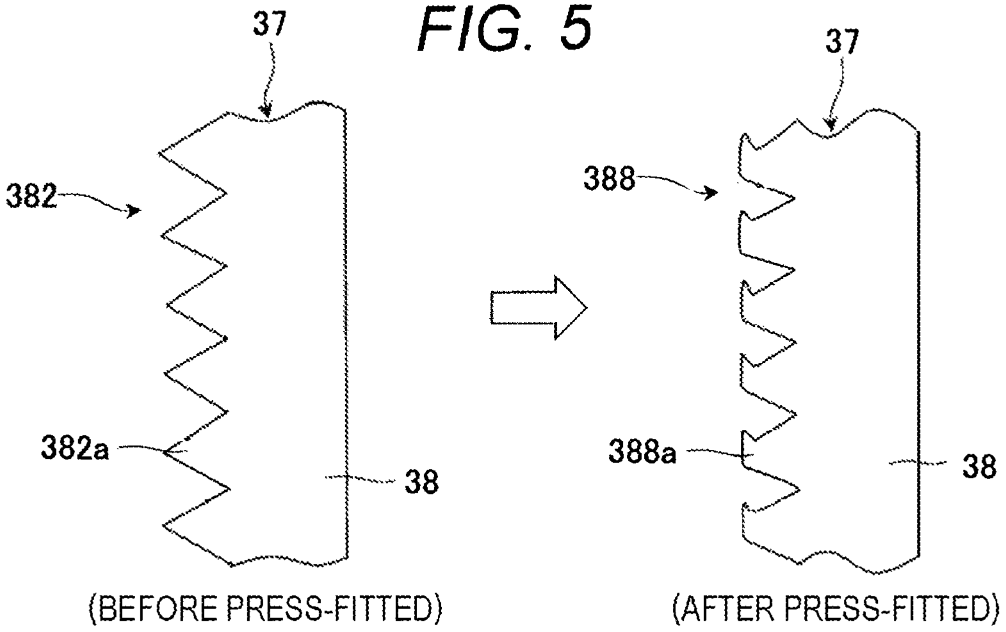
FIG. 5 is an explanatory view illustrating a change in shape of a tool mark of a component surface when the two components (the valve member and the cap) constituting the coupling body according to the first embodiment of the present invention illustrated in FIG. 4 are press-fitted.
Figure 6:
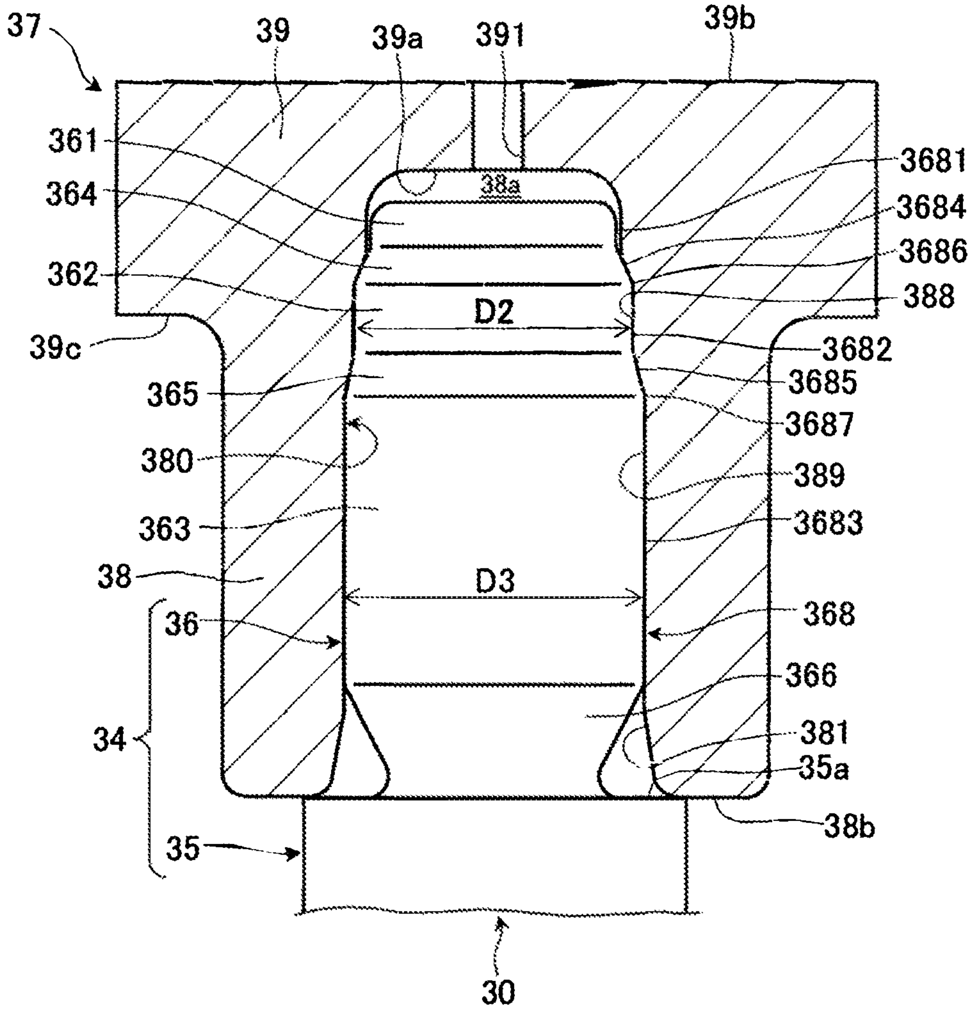
FIG. 6 is a cross-sectional view illustrating states of the two components constituting the coupling body according to the first embodiment of the present invention when having been completely press-fitted (a structure of the coupling body).

Next, a method for manufacturing the coupling body and a structure of the coupling body according to the first embodiment of the present invention will be described with reference to FIGS. 3 to 6. FIG. 3 is a cross-sectional view illustrating structures of the two components (the valve member and the cap), which constitute the coupling body, before coupled (before press-fitted) according to the first embodiment of the present invention. FIG. 4 is a cross-sectional view illustrating states of the two components (the valve member and the cap) constituting the coupling body according to the first embodiment of the present invention illustrated in FIG. 3 while being press-fitted. FIG. 5 is an explanatory view illustrating a change in shape of a tool mark of a component surface when the two components (the valve member and the cap) constituting the coupling body according to the first embodiment of the present invention illustrated in FIG. 4 are press-fitted. FIG. 6 is a cross-sectional view illustrating states of the two components constituting the coupling body according to the first embodiment of the present invention when having been completely press-fitted (a structure of the coupling body).

A method for manufacturing a coupling body including the valve member 30 as a first component and the cap 37 as a second component includes a first forming step of forming the coupling shaft-shaped portion 36 in the protruding portion 34 of the valve member 30, a second forming step of forming the pit portion 38*a* in the cap 37, and a press-fitting step of press-fitting the coupling shaft-shaped portion 36 of the valve member 30 into the pit portion 38*a* of the cap 37. In the present embodiment, the valve member 30, which is a first component, is formed of a component having a relatively higher hardness than the cap 37, which is a second component. The valve member 30 is a high-hardness (high-strength) component formed of, for example, a martensitic steel material and subjected to quenching. In the press-fitting step according to the present embodiment, two-stage deformations including a first-stage deformation in a plastic region and a second-stage deformation having a smaller deformation amount than the first-stage deformation are generated on the inner peripheral surface 380 of the pit portion 38*a* of the cap 37 having a relatively low hardness according to a shape of the outer peripheral surface of the coupling shaft-shaped portion 36 of the valve member 30 having a relatively high hardness, thereby coupling the two components 30 and 37. The deformation generated on the coupling shaft-shaped portion 36 of the valve member 30 in the press-fitting step can be ignored as compared with the deformation of the inner peripheral surface 380 of the pit portion 38*a* of the cap 37.

Specifically, in the second forming step, as illustrated in FIG. 3, the inner peripheral surface 380 of the pit portion 38*a* of the cap 37 is formed to include a tapered inner peripheral surface 381 positioned on the open side and a cylindrical inner peripheral surface 382 positioned closer to the bottom surface 39*a* than the tapered inner peripheral surface 381. The tapered inner peripheral surface 381 is formed to gradually increase in diameter toward the open side of the pit portion 38*a*. An inner diameter D1 of the cylindrical inner peripheral surface 382 is, for example, about 1 mm.

In the first forming step, as illustrated in FIG. 3, the coupling shaft-shaped portion 36 of the valve member 30 is formed to include an introduction portion 361 which is a distal end portion, a processing portion 362 positioned closer to a rear side (the sliding shaft-shaped portion 35) in a press-fitting direction P than the introduction portion 361, a coupling portion 363 positioned closer to the rear side in the press-fitting direction P than the processing portion 362, a first tapered portion 364 connecting the introduction portion 361 and the processing portion 362 to each other, a second tapered portion 365 connecting the processing portion 362 and the coupling portion 363, and a neck portion 366 connected to the coupling portion 363 and the sliding shaft-shaped portion 35. The introduction portion 361 is a portion for guide into the pit portion 38*a* of the cap 37. The processing portion 362 is a portion for the first-stage deformation by which the inner peripheral surface 380 of the cap 37 is plastically processed to increase a diameter at the time of press fitting, and an axial length thereof may be any length as long as the plastic processing can be performed. The coupling portion 363 is a portion to be coupled to the inner peripheral surface 380 of the cap 37, and an axial length thereof is set to a length with which necessary coupling strength is obtained.

An outer peripheral surface 368 of the coupling shaft-shaped portion 36 includes an introduction surface 3681 of the introduction portion 361 having an outer diameter smaller than an inner diameter of the pit portion 38*a* of the cap 37, a first-stage cylindrical outer peripheral surface 3682 of the processing portion 362 having an outer diameter D2 larger than the inner diameter D1 of the cylindrical inner peripheral surface 382 of the cap 37, a second-stage cylindrical outer peripheral surface 3683 of the coupling portion 363 having an outer diameter D3 larger than the outer diameter D2 of the first-stage cylindrical outer peripheral surface 3682, a first tapered outer peripheral surface 3684 of the first tapered portion 364 have a diameter that gradually decreases from the processing portion 362 side toward the introduction portion 361 side (the distal end side), and a second tapered outer peripheral surface 3685 of the second tapered portion 365 having a diameter that gradually decreases from the coupling portion 363 side toward the processing portion 362 side (the distal end side). The first tapered outer peripheral surface 3684 and the first-stage cylindrical outer peripheral surface 3682 are continuous via a first R-chamfered portion 3686. The second tapered outer peripheral surface 3685 and the second-stage cylindrical outer peripheral surface 3683 are continuous via a second R-chamfered portion 3687.

The outer diameter D2 of the first-stage cylindrical outer peripheral surface 3682 is set to a size having a deformation allowance ΔD1 that causes a deformation in a plastic region on the cylindrical inner peripheral surface 382 with respect to the inner diameter D1 of the cylindrical inner peripheral surface 382 of the cap 37. The second-stage cylindrical outer peripheral surface 3683 protrudes outward in the radial direction to form a step with respect to the first-stage cylindrical outer peripheral surface 3682. As compared with the outer diameter D2 of the first-stage cylindrical outer peripheral surface 3682, the outer diameter D3 of the second-stage cylindrical outer peripheral surface 3683 is set to a size having a fastening allowance ΔI1 (a press-fitting allowance) for deforming the inner peripheral surface 380 of the cap 37 (having an inner diameter of the same dimension as the outer diameter D2) having a diameter that has been increased through plastic deformation by the first-stage cylindrical outer peripheral surface 3682 in an amount smaller than the deformation amount of the inner peripheral surface 380 of the cap 37 deformed by the first-stage cylindrical outer peripheral surface 3682. That is, a difference in outer diameter (D3−D2) between the second-stage cylindrical outer peripheral surface 3683 and the first-stage cylindrical outer peripheral surface 3682 is set as the fastening allowance ΔI1 of the coupling body. Specifically, the fastening allowance ΔI1 is set to a size that causes a deformation within an elastic region or in a plastic region equal to or smaller than a predetermined region (which may hereinafter be referred to as an elastoplastic deformation). In the present embodiment, the plastic region equal to or smaller than the predetermined region refers to a plastic region in which a deformation amount is equal to or less than 10%, preferably equal to or less than 5%, of a diameter in a press-fitted state (the outer diameter D2 of the first-stage cylindrical outer peripheral surface 3682).

In the press-fitting step, first, as illustrated in FIG. 4, the processing portion 362 of the coupling shaft-shaped portion 36 is press-fitted into the pit portion 38*a* of the cap 37. At this time, the first-stage cylindrical outer peripheral surface 3682 of the processing portion 362 plastically processes the cylindrical inner peripheral surface 382 of the inner peripheral surface 380 of the cap 37. As a result, the diameter of the cylindrical inner peripheral surface 382 of the cap 37 is increased to have the same dimension as the outer diameter D2 of the first-stage cylindrical outer peripheral surface 3682 of the processing portion 362, thereby forming a plastically processed surface 388. That is, the plastically processed surface 388 is formed by deforming the cylindrical inner peripheral surface 382 in the plastic region, and works advantageously on coupling strength due to work hardening accompanied by the plastic deformation.

In addition, when the first-stage cylindrical outer peripheral surface 3682 of the processing portion 362 plastically processes the cylindrical inner peripheral surface 382 of the cap 37, as illustrated in FIG. 5, sharp distal end portions 382*a* (see the left diagram in FIG. 5) of an uneven portion of the tool mark formed on the cylindrical inner peripheral surface 382 become leveled, rather than being cut, by the first R-chamfered portion 3686 (see FIG. 4) of the coupling shaft-shaped portion 36, and distal end portions 388*a* (see the right diagram in FIG. 5) of an uneven portion of the plastically processed surface 388 are flat surfaces in a deformed state. Therefore, it is possible to suppress generation of a new surface at the distal end portion 388*a* of the uneven portion of the plastically processed surface 388.

In the press-fitting step, as illustrated in FIG. 6, the entire coupling portion 363 of the coupling shaft-shaped portion 36 is further press-fitted into the pit portion 38*a* of the cap 37. When a distal end surface 38*b* of the tubular portion 38 of the cap 37 abuts on a distal end surface 35*a* of the sliding shaft-shaped portion 35 of the protruding portion 34 of the valve member 30, the press-fitting of the coupling shaft-shaped portion 36 into the pit portion 38*a* of the cap 37 is restricted.

At this time, the second-stage cylindrical outer peripheral surface 3683 of the coupling portion 363 deforms the plastically processed surface 388 of the cap 37, which has been subjected to the deformation in the plastic region by the first-stage cylindrical outer peripheral surface 3682 of the processing portion 362, within an elastic region or within a plastic region equal to or smaller than a predetermined region. As a result, a coupling inner peripheral surface 389, which has been generated when the plastically processed surface 388 is deformed in the elastic region or in the plastic region equal to or smaller than the predetermined region, is coupled to the second-stage cylindrical outer peripheral surface 3683 of the coupling portion 363, thereby securing coupling strength between the cap 37 and the valve member 30 of the coupling body.

That is, the coupling body according to the present embodiment is configured in such a manner that the outer peripheral surface 368 of the coupling shaft-shaped portion 36 of the valve member 30 having a relatively high hardness includes a first-stage cylindrical outer peripheral surface 3682 and a second-stage cylindrical outer peripheral surface 3683 protruding in the radial direction further outward than the first-stage cylindrical outer peripheral surface 3682 to form a step with respect to the first-stage cylindrical outer peripheral surface 3682, and the step (the difference D3−D2 in outer diameter) between the second-stage cylindrical outer peripheral surface 3683 and the first-stage cylindrical outer peripheral surface 3682 is a fastening allowance (a press-fitting allowance) with respect to the inner peripheral surface 380 of the cap 37. The outer diameter D2 of the first-stage cylindrical outer peripheral surface 3682 is set, relative to the inner diameter D1 of the cylindrical inner peripheral surface 382 of the cap 37, within a range in which the cylindrical inner peripheral surface 382 is deformed in the plastic region, and the fastening allowance (the difference in outer diameter between the second-stage cylindrical outer peripheral surface 3683 and the first-stage cylindrical outer peripheral surface 3682) is set within a range in which the plastically processed surface 388 of the cap 37, which has been deformed to have the same dimension as the outer diameter D2 of the first-stage cylindrical outer peripheral surface 3682 of the coupling shaft-shaped portion 36, is deformed in the elastic region or in the plastic region equal to or smaller than the predetermined region. As a result, the inner peripheral surface 380 of the cap 37 having a relatively low hardness includes a plastically processed surface 388 coupled to the second-stage cylindrical outer peripheral surface 3683 in a plastically deformed state, and also includes a coupling inner peripheral surface 389 coupled to the second-stage cylindrical outer peripheral surface 3683 of the coupling shaft-shaped portion 36 in a deformed state within the elastic region or within the plastic region equal to or smaller than the predetermined region.

As described above, the press-fitting step includes a first stage at which the inner peripheral surface 380 of the cap 37 is deformed in the plastic region by the first-stage cylindrical outer peripheral surface 3682 of the coupling shaft-shaped portion 36 of the valve member 30, and a second stage at which the inner peripheral surface 380 (the plastically processed surface 388) of the cap 37 subjected to the deformation in the plastic region is deformed by the second-stage cylindrical outer peripheral surface 3683 of the coupling shaft-shaped portion 36 in an amount smaller than the deformation amount at the first stage (specifically, in the elastic region or in the plastic region equal to or smaller than the predetermined region).

Figure 7:
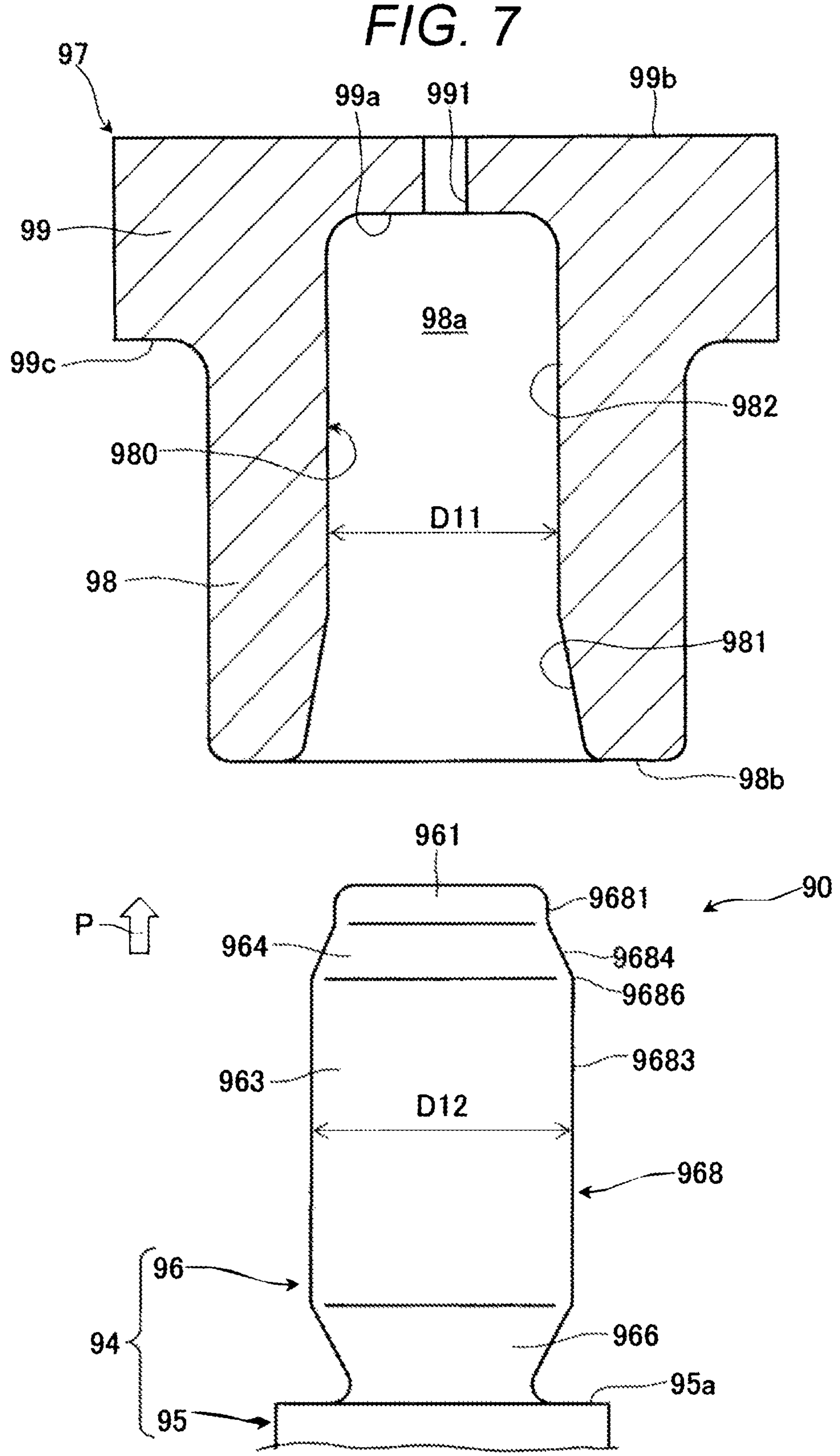
FIG. 7 is a cross-sectional view illustrating structures of two components (a valve member and a cap), which constitutes a coupling body, before coupled (before press-fitted) in a comparative example with respect to the first embodiment of the present invention.
Figure 8:
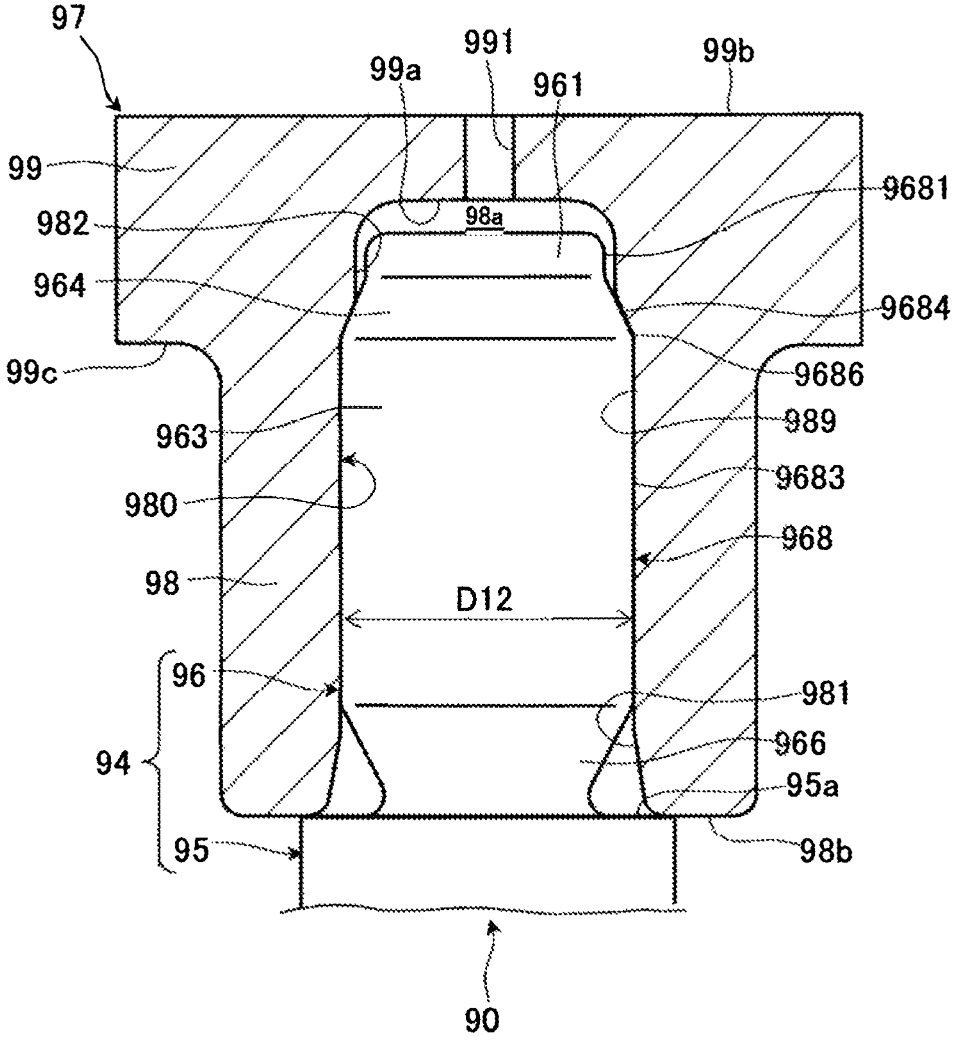
FIG. 8 is a cross-sectional view illustrating states of the two components (the valve member and the cap) constituting the coupling body in the comparative example illustrated in FIG. 7 when having been completely press-fitted (a structure of the coupling body).
Figure 9:
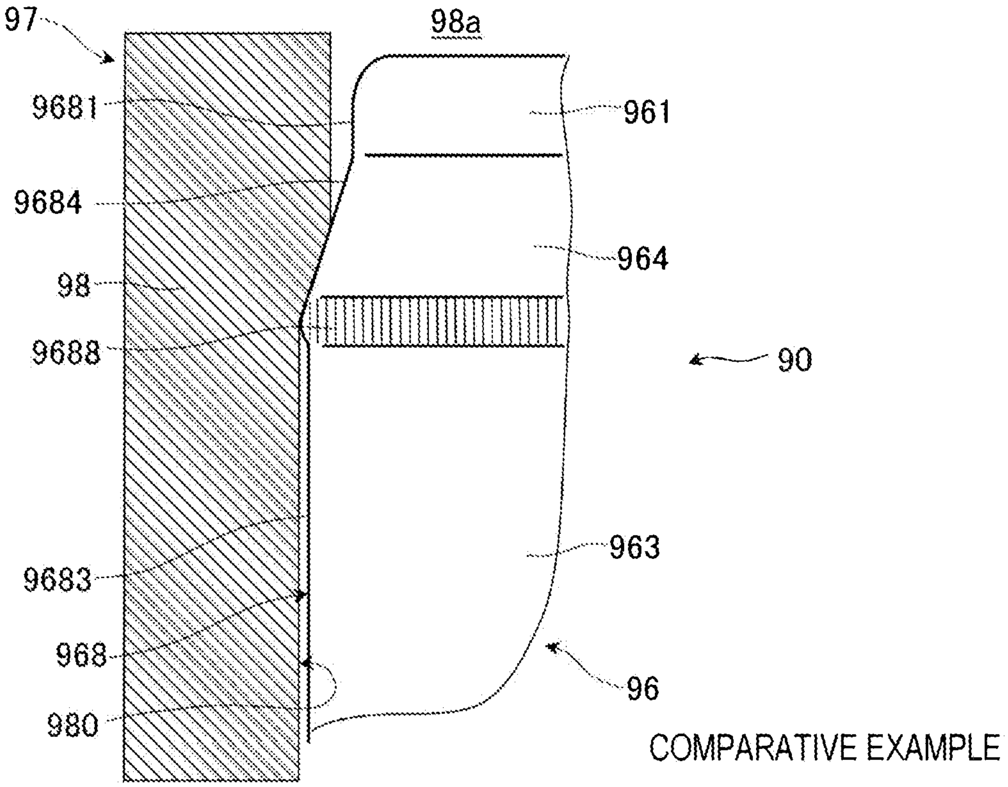
FIG. 9 is a schematic view illustrating a coupling state between the two components (the valve member and the cap) constituting the coupling body in the comparative example when galling occurs in a step of press-fitting the two components.

Next, functions and effects of the coupling body and the method for manufacturing the coupling body according to the first embodiment of the present invention will be described in comparison with a coupling body and a method for manufacturing the coupling body in a comparative example. First, a coupling body and a method for manufacturing the coupling body in a comparative example will be described with reference to FIGS. 7 to 9. FIG. 7 is a cross-sectional view illustrating structures of two components (a valve member and a cap), which constitutes a coupling body, before coupled (before press-fitted) in a comparative example with respect to the first embodiment of the present invention. FIG. 8 is a cross-sectional view illustrating states of the two components (the valve member and the cap) constituting the coupling body in the comparative example illustrated in FIG. 7 when having been completely press-fitted (a structure of the coupling body). FIG. 9 is a schematic view illustrating a coupling state between the two components (the valve member and the cap) constituting the coupling body in the comparative example when galling occurs in a step of press-fitting the two components.

Similarly to the method for manufacturing the coupling body according to the present embodiment, the method for manufacturing the coupling body in the comparative example includes a first forming step of forming a coupling shaft-shaped portion 96 in a protruding portion 94 of a valve member 90, a second forming step of forming a pit portion 98*a* in a cap 97, and a press-fitting step of press-fitting the coupling shaft-shaped portion 96 of the valve member 90 into the pit portion 98*a* of the cap 97. Similarly to the coupling body according to the present embodiment, in the coupling body according to the comparative example, the valve member 90 is formed of a component having a relatively higher hardness than the cap 97.

In the second forming step, as illustrated in FIG. 7, an inner peripheral surface 980 of the pit portion 98*a* of the cap 97 is formed to include a tapered inner peripheral surface 981 positioned on the open side and having a diameter that gradually increases toward the open side of the pit portion 98*a*, and a cylindrical inner peripheral surface 982 positioned closer to a bottom surface 99*a* than the tapered inner peripheral surface 981. The inner peripheral surface 980 of the cap 97 in the comparative example has the same shape as the inner peripheral surface 380 of the cap 37 in the present embodiment.

In the first forming step, as illustrated in FIG. 7, the coupling shaft-shaped portion 96 of the valve member 90 is formed to include an introduction portion 961 which is a distal end portion, a coupling portion 963 positioned closer to a rear side (the sliding shaft-shaped portion 35) in a press-fitting direction P than the introduction portion 961, a tapered portion 964 connecting the introduction portion 961 and the coupling portion 963, and a neck portion 966 connected to the coupling portion 963 and the sliding shaft-shaped portion 95. The introduction portion 961 is a portion for guide into the pit portion 98*a* of the cap 97. The coupling portion 963 is a portion to be coupled to the inner peripheral surface 980 of the cap 97.

An outer peripheral surface 968 of the coupling shaft-shaped portion 96 includes an introduction surface 9681 of the introduction portion 961 having an outer diameter smaller than an inner diameter of the inner peripheral surface 980 of the cap 97, a cylindrical outer peripheral surface 9683 of the coupling portion 963 having an outer diameter D12 larger than an inner diameter D11 of the cylindrical inner peripheral surface 982 of the cap 97, and a tapered outer peripheral surface 9684 of the tapered portion 964 having a diameter that gradually decreases from the coupling portion 963 side toward the introduction portion 961 side (the distal end side). The tapered outer peripheral surface 9684 and the cylindrical outer peripheral surface 9683 are continuous via an R-chamfered portion 9686.

The outer diameter D12 of the cylindrical outer peripheral surface 9683 is set to a size having a fastening allowance that causes a deformation in an elastic region on the cylindrical inner peripheral surface 982 with respect to the inner diameter D11 of the cylindrical inner peripheral surface 982 of the cap 97. Also, the outer diameter D12 of the cylindrical outer peripheral surface 9683 can be set to a size having a fastening allowance that causes a deformation in a plastic region on the cylindrical inner peripheral surface 982 with respect to the inner diameter D11 of the cylindrical inner peripheral surface 982 of the cap 97.

In the press-fitting step, as illustrated in FIG. 8, the entire coupling portion 963 of the coupling shaft-shaped portion 96 is press-fitted into the pit portion 98*a* of the cap 97. At this time, the cylindrical outer peripheral surface 9683 of the coupling portion 963 deforms the cylindrical inner peripheral surface 982 (see FIG. 7) of the inner peripheral surface 980 of the cap 97 in the elastic region, thereby generating a coupling inner peripheral surface 989. The coupling inner peripheral surface 989 is coupled to the cylindrical outer peripheral surface 9683, thereby securing the coupling strength between the cap 97 and the valve member 90 of the coupling body.

As described above, in the coupling body of the valve member 90 and the cap 97 according to the comparative example, the fastening allowance (the press-fitting allowance) is determined by a diameter difference between the outer diameter D12 of the cylindrical outer peripheral surface 9683 of the coupling portion 963 of the coupling shaft-shaped portion 96 and the inner diameter D11 of the cylindrical inner peripheral surface 982 of the cap 97. Since the two components, the valve member 90 and the cap 97, are machined by different machine tools, the fastening allowance determined depending on the diameter difference (D12−D11) between the two components 90 and 97 largely varies due to dimensional tolerances of the two components 90 and 97. From the viewpoint of processing accuracy of machine tool and manufacturing cost, it is difficult to set the dimensional tolerances of the two components 90 and 97 to an extremely small range in order to suppress a variation in fastening allowance.

On the other hand, when the two components 90 and 97 are coupled to each other by deformation in a plastic region with a fastening allowance determined by the diameter difference (D12−D11) between the two components 90 and 97 being set to be large, there is a problem that galling is likely to occur in the two components 90 and 97. When the press fitting between the two components 90 and 97 is started, the tapered portion 964 of the coupling shaft-shaped portion 96 abuts on the inner peripheral surface 980 of the cap 97, thereby centering the coupling shaft-shaped portion 96 with respect to the pit portion 98*a* of the cap 97. However, during centering, the coupling shaft-shaped portion 96 may fall with respect to the pit portion 98*a* of the cap 97 and partially abut on the pit portion 98*a* of the cap 97. In this case, as illustrated in FIG. 9, galling may occur in the tapered outer peripheral surface 9684 of the coupling shaft-shaped portion 96 and the R-chamfered portion 9686 (see FIG. 7).

On the inner peripheral surface 980 of the cap 97, an uneven portion is formed as a tool mark at the time of processing (see the left diagram in FIG. 5). Since a high stress is generated in a portion contacting a ridge portion of the tool mark, galling is likely to occur. When galling occurs on the outer peripheral surface 968 such as the tapered outer peripheral surface 9684 of the coupling shaft-shaped portion 96, the diameter of the cylindrical inner peripheral surface 982 of the cap 97 is increased by a swelling galling portion 9688, resulting in a decrease in fastening allowance between the two components, thereby reducing coupling strength between the two components. As illustrated in FIG. 9, when a gap is formed between the cylindrical outer peripheral surface 9683 of the coupling shaft-shaped portion 96 and the inner peripheral surface 980 of the cap 97 due to the swelling of the galling portion 9688, it is not possible to secure a fastening allowance between the two components 90 and 97, and the two components 90 and 97 are linearly coupled to each other only in a region of the galling portion 9688. Therefore, when a force acts on the coupling shaft-shaped portion 96 of the coupling body in a bending direction, the coupling is likely to rattle. That is, the occurrence of galling deteriorates the coupling strength between the two components 90 and 97.

Figure 10:
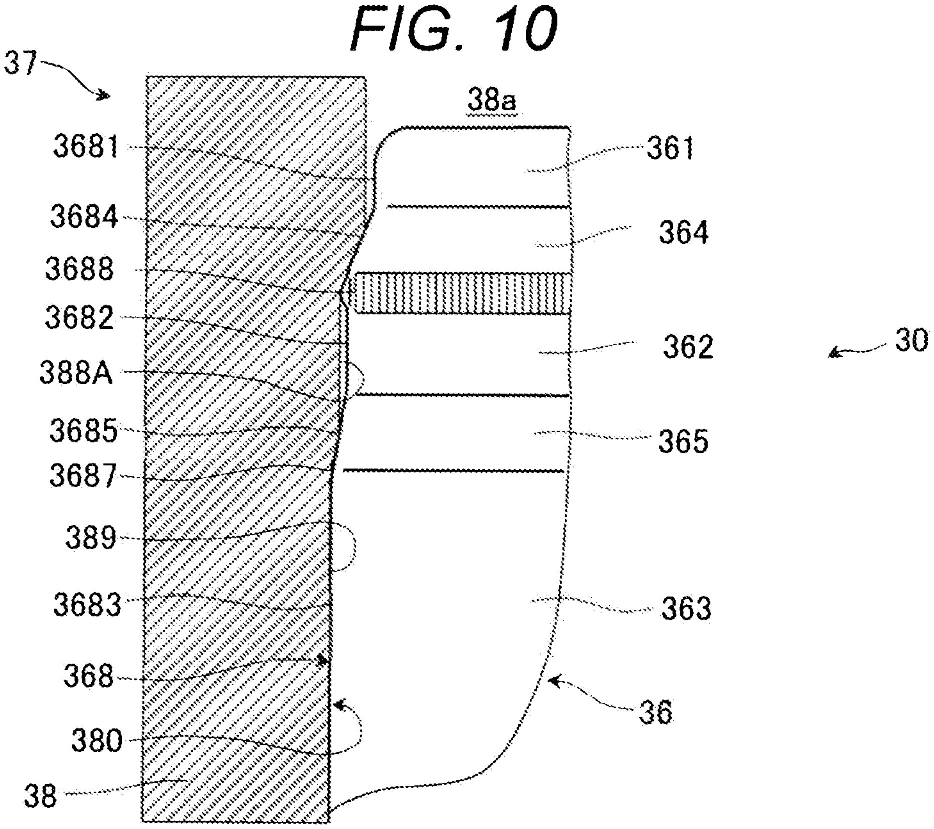
FIG. 10 is a schematic view illustrating a coupling state between the two components (the valve member and the cap) constituting the coupling body according to the first embodiment of the present invention when galling occurs in a step of press-fitting the two components.

Next, functions and effects of the coupling body and the method for manufacturing the coupling body according to the first embodiment of the present invention will be described with reference to FIGS. 3 to 6 and 10. FIG. 10 is a schematic view illustrating a coupling state between the two components (the valve member and the cap) constituting the coupling body according to the first embodiment of the present invention when galling occurs in a step of press-fitting the two components.

In the present embodiment, the fastening allowance (the press-fitting allowance) between the two components 30 and 37 of the coupling body is determined by the step (the difference in outer diameter) between the first-stage cylindrical outer peripheral surface 3682 of the processing portion 362 of the coupling shaft-shaped portion 36 and the second-stage cylindrical outer peripheral surface 3683 of the coupling portion 363 as illustrated in FIG. 3, rather than being determined by the difference in diameter between the two components 90 and 97 like the fastening allowance between the valve member 90 and the cap 97 of the coupling body in the comparative example illustrated in FIG. 7. That is, the fastening allowance between the coupling shaft-shaped portion 36 of the valve member 30 and the pit portion 38*a* of the cap 37 is defined by a dimensional variation of the coupling shaft-shaped portion 36 (one component). Therefore, the fastening allowance between the two components 30 and 37 varies only within a dimensional tolerance range of the valve member 30. Therefore, it is possible to reduce a variation in coupling strength without increasing accuracy in processing the two components 30 and 37.

In addition, in the present embodiment, when the press fitting between the two components 30 and 37 is started, the tapered outer peripheral surface 3684 of the first tapered portion 364 of the coupling shaft-shaped portion 36 abuts on the cylindrical inner peripheral surface 382 of the cap 37, thereby centering the coupling shaft-shaped portion 36 with respect to the pit portion 38*a* of the cap 37. At this time, when the coupling shaft-shaped portion 36 partially abuts on the cylindrical inner peripheral surface 382 of the cap 37, it is assumed that galling occurs on the first-stage cylindrical outer peripheral surface 3682 of the processing portion 362 of the coupling shaft-shaped portion 36 as illustrated in FIG. 10. In this case, the cylindrical inner peripheral surface 382 (see FIGS. 3 and 4) of the cap 37 is plastically deformed by a swelling galling portion, thereby forming a plastically processed surface 388A with an increased diameter. The inner diameter of the plastically processed surface 388A is larger than the inner diameter of the plastically processed surface 388 (see FIG. 5) that has been increased through the plastic deformation by the first-stage cylindrical outer peripheral surface 3682. That is, the inner diameter of the plastically processed surface 388A generated by the galling portion is larger than the outer diameter D2 of the first-stage cylindrical outer peripheral surface 3682.

However, in the present embodiment, a fastening allowance can be secured between the second-stage cylindrical outer peripheral surface 3683 having an outer diameter D3 larger than the outer diameter D2 of the first-stage cylindrical outer peripheral surface 3682 and the plastically processed surface 388A of the cap 37. Since the centering is achieved when the first-stage cylindrical outer peripheral surface 3682 and the inner peripheral surface 380 of the cap 37 contact each other, the second-stage cylindrical outer peripheral surface 3683 and the inner peripheral surface 380 of the cap 37 contact each other over substantially their entire circumferences, not partially contacting each other. As a result, galling can be suppressed from occurring between the two components 3683 and 380.

Further, since the cylindrical inner peripheral surface 382 of the cap 37 is plastically processed by the first-stage cylindrical outer peripheral surface 3682, the distal end portion 382*a* of the ridge portion of the tool mark formed on the cylindrical inner peripheral surface 382 becomes flat as illustrated in FIG. 5. Therefore, when the second-stage cylindrical outer peripheral surface 3683 comes into contact with the plastically processed surface 388 generated by plastically deforming the cylindrical inner peripheral surface 382, since the distal end portion 388*a* of the ridge portion of the plastically processed surface 388 is flat, it is possible to suppress a high stress on the second-stage cylindrical outer peripheral surface 3683. Accordingly, the occurrence of galling between the second-stage cylindrical outer peripheral surface 3683 and the plastically processed surface 388 can be suppressed, and an entire coupling surface between the second-stage cylindrical outer peripheral surface 3683 and the coupling inner peripheral surface 389 of the cap 37 can be secured. As a result, coupling strength between the two components 30 and 37 can be secured.

As described above, the method for manufacturing the coupling body according to the first embodiment includes a first forming step of forming a coupling shaft-shaped portion 36 (a rod-shaped portion) in a valve member 30 (a first component), a second forming step of forming a pit portion 38*a* in a cap 37 (a second component), and a press-fitting step of press-fitting the coupling shaft-shaped portion 36 (the rod-shaped portion) of the valve member 30 (the first component) into the pit portion 38*a* of the cap 37 (the second component). Of an outer peripheral surface 368 of the coupling shaft-shaped portion 36 (the rod-shaped portion) of the valve member 30 (the first component) and an inner peripheral surface 380 of the pit portion 38*a* of the cap 37 (the second component), the outer peripheral surface 368 (a peripheral surface) of the valve member 30 (a high-hardness component) having a relatively high hardness includes a first-stage cylindrical outer peripheral surface 3682 (a first-stage cylindrical surface) having a diameter difference with respect to the inner peripheral surface 380 (a peripheral surface) of the cap 37 (a low-hardness component) having a relatively low hardness, and a second-stage cylindrical outer peripheral surface 3683 (a second-stage cylindrical surface) positioned closer to a rear side in a press-fitting direction P than the first-stage cylindrical outer peripheral surface 3682 (the first-stage cylindrical surface) and protruding in the radial direction to form a step with respect to the first-stage cylindrical outer peripheral surface 3682 (the first-stage cylindrical surface). The press-fitting step includes a first stage at which the inner peripheral surface 380 (the peripheral surface) of the cap 37 (the low-hardness component) is deformed in a plastic region by the first-stage cylindrical outer peripheral surface 3682 (the first-stage cylindrical surface) of the valve member 30 (the high-hardness component), and a second stage at which a plastically processed surface 388 (a peripheral surface) of the cap 37 (the low-hardness component) subjected to the deformation in the plastic region is deformed by the second-stage cylindrical outer peripheral surface 3683 (the second-stage cylindrical surface) of the valve member 30 (the high-hardness component) in an amount smaller than the deformation amount at the first stage.

According to this method, the two components 30 and 37 are coupled to each other through the first stage at which the inner peripheral surface 380 (the peripheral surface) of the cap 37 (the low-hardness component) is plastically deformed by the first-stage cylindrical outer peripheral surface 3682 (the first-stage cylindrical surface) of the valve member 30 (the high-hardness component) to be formed to have the same dimension as the diameter of the first-stage cylindrical outer peripheral surface 3682 (the first-stage cylindrical surface), and then, the second stage at which the inner peripheral surface 380 (the peripheral surface) of the cap 37 (the low-hardness component) is further deformed by the second-stage cylindrical outer peripheral surface 3683 (the second-stage cylindrical surface) of the valve member 30 (the high-hardness component) in an amount smaller than the deformation amount at the first stage. Therefore, a fastening allowance (a press-fitting allowance) for achieving coupling through the second-stage deformation is determined by a step (a difference in diameter) between the second-stage cylindrical outer peripheral surface 3683 (the second-stage cylindrical surface) and the first-stage cylindrical outer peripheral surface 3682 (the first-stage cylindrical surface) of the valve member 30 (the high-hardness component), not by a difference in diameter between the two components, the valve member 30 (the high-hardness component) and the cap 37 (the low-hardness component). Therefore, the fastening allowance (the press-fitting allowance) varies within a processing accuracy (dimensional tolerance) range of the valve member 30 (the high-hardness component), but is not affected by accuracy (dimensional tolerance) in processing the two components 30 and 37. Therefore, it is possible to reduce a variation in coupling strength without increasing accuracy in processing the two components 30 and 37.

In the method for manufacturing the coupling body according to the present embodiment, in the first forming step, a first tapered outer peripheral surface 3684 (a tapered outer peripheral surface) is further formed on the outer peripheral surface 368 of the coupling shaft-shaped portion 36 (the rod-shaped portion) of the valve member 30 (the first component), the first tapered outer peripheral surface 3684 (the tapered outer peripheral surface) being positioned closer to a distal end side than the first-stage cylindrical outer peripheral surface 3682 and having a diameter that decreases toward the distal end side. In addition, in the press-fitting step, the first tapered outer peripheral surface 3684 (the tapered outer peripheral surface) of the coupling shaft-shaped portion 36 (the rod-shaped portion) of the valve member 30 (the first component) is brought into contact with the inner peripheral surface 380 of the pit portion 38*a* of the cap 37 (the second component), thereby centering the coupling shaft-shaped portion 36 (the rod-shaped portion) with respect to the pit portion 38*a*.

According to this method, the fastening allowance between the coupling shaft-shaped portion 36 (the rod-shaped portion) of the valve member 30 (the first component) and the pit portion 38*a* of the cap 37 (the second component) can be substantially uniform in the entire circumferential direction, making it possible to prevent coupling in a state where coupling strength is low.

In the method for manufacturing the coupling body according to the present embodiment, the first tapered outer peripheral surface 3684 (the tapered outer peripheral surface) and the first-stage cylindrical outer peripheral surface 3682 of the valve member 30 (the first component) are continuous via a first R-chamfered portion 3686 (an R-chamfered portion). In addition, in the press-fitting step, the inner peripheral surface 380 of the pit portion 38*a* of the cap 37 (the second component) is pressed by the first R-chamfered portion 3686 (the R-chamfered portion) of the coupling shaft-shaped portion 36 (the rod-shaped portion) of the valve member 30 (the first component).

According to this method, sharp distal end portions 382*a* of an uneven tool mark formed on the inner peripheral surface 380 of the cap 37 (the second component) can be deformed to be flat by the first R-chamfered portion 3686

(the R-chamfered portion) of the coupling shaft-shaped portion 36 (the rod-shaped portion). Therefore, it is possible to suppress galling that may occur when the first-stage cylindrical outer peripheral surface 3682 of the coupling shaft-shaped portion 36 (the rod-shaped portion) and the inner peripheral surface 380 of the cap 37 (the second component) are press-fitted, and it is also possible to suppress a deterioration in coupling strength caused by galling.

As described above, in the coupling body according to the present embodiment, the valve member 30 (the first component) having the coupling shaft-shaped portion 36 (the rod-shaped portion) and the cap 37 (the second component) having the pit portion 38*a* are coupled to each other by press-fitting the coupling shaft-shaped portion 36 (the rod-shaped portion) and the pit portion 38*a*. Of an outer peripheral surface 368 of the coupling shaft-shaped portion 36 (the rod-shaped portion) of the valve member 30 (the first component) and an inner peripheral surface 380 of the pit portion 38*a* of the cap 37 (the second component), the outer peripheral surface 368 (a peripheral surface) of the valve member 30 (a high-hardness component) having a relatively high hardness includes a first-stage cylindrical outer peripheral surface 3682 (a first-stage cylindrical surface), and a second-stage cylindrical outer peripheral surface 3683 (a second-stage cylindrical surface) positioned closer to a rear side in a press-fitting direction P than the first-stage cylindrical outer peripheral surface 3682 (the first-stage cylindrical surface) and protruding in the radial direction further than the first-stage cylindrical outer peripheral surface 3682 (the first-stage cylindrical surface) to form a step with respect to the first-stage cylindrical outer peripheral surface 3682 (the first-stage cylindrical surface). Of an outer peripheral surface 368 of the coupling shaft-shaped portion 36 (the rod-shaped portion) of the valve member 30 (the first component) and an inner peripheral surface 380 of the pit portion 38*a* of the cap 37 (the second component), a partial portion of the inner peripheral surface 380 (a peripheral surface) of the cap 37 (a low-hardness component) having a relatively low hardness is coupled to the first-stage cylindrical outer peripheral surface 3682 (the first-stage cylindrical surface) in a plastically deformed state, and another portion of the inner peripheral surface 380 (the peripheral surface) of the cap 37 (the low-hardness component) is coupled to the second-stage cylindrical outer peripheral surface 3683 (the second-stage cylindrical surface) in a deformed state in an elastic region or in a plastic region equal to or smaller than a predetermined region.

According to this configuration, by providing the first-stage cylindrical outer peripheral surface 3682 (the first-stage cylindrical surface) and the second-stage cylindrical outer peripheral surface 3683 (the second-stage cylindrical surface) forming a step on the outer peripheral surface 368 (the peripheral surface) of the valve member 30 (the high-hardness component), a partial portion of the inner peripheral surface 380 (the peripheral surface) of the cap 37 (the low-hardness component) having a relatively low hardness is coupled to the first-stage cylindrical outer peripheral surface 3682 (the first-stage cylindrical surface) in a plastically deformed state, and another portion of the inner peripheral surface 380 (the peripheral surface) of the cap 37 (the low-hardness component) is coupled to the second-stage cylindrical outer peripheral surface 3683 (the second-stage cylindrical surface) in a deformed state in an elastic region or in a plastic region (an elastoplastic region) equal to or smaller than a predetermined region. That is, the fastening allowance (the press-fitting allowance) for achieving coupling through the deformation in the elastoplastic region is determined by a step (a difference in diameter) between the first-stage cylindrical outer peripheral surface 3682 (the first-stage cylindrical surface) and the second-stage cylindrical outer peripheral surface 3683 (the second-stage cylindrical surface) of the valve member 30 (the high-hardness component), not by a difference in diameter between the two components, the valve member 30 (the high-hardness component) and the cap 37 (the low-hardness component). Accordingly, the fastening allowance (the press-fitting allowance) varies within a processing accuracy (dimensional tolerance) range of the valve member 30 (the high-hardness component), but is not affected by accuracy (dimensional tolerance) in processing the two components 30 and 37. As a result, it is possible to reduce a variation in coupling strength without increasing accuracy in processing the two components 30 and 37.

In the coupling body according to the present embodiment, the coupling shaft-shaped portion 36 (the rod-shaped portion) further includes a first tapered outer peripheral surface 3684 (a tapered outer peripheral surface) positioned closer to a distal end side than the first-stage cylindrical outer peripheral surface 3682 and having a diameter that decreases toward the distal end side.

According to this configuration, in the press-fitting step, the first tapered outer peripheral surface 3684 (the tapered outer peripheral surface) of the coupling shaft-shaped portion 36 (the rod-shaped portion) is brought into contact with the inner peripheral surface 380 of the pit portion 38*a* of the cap 37 (the second component), thereby centering the coupling shaft-shaped portion 36 (the rod-shaped portion) with respect to the pit portion 38*a*. Therefore, the fastening allowance between the coupling shaft-shaped portion 36 (the rod-shaped portion) and the pit portion 38*a* of the cap 37 (the second component) can be substantially uniform in the entire circumferential direction, making it possible to prevent coupling in a state where coupling strength is low.

In the coupling body according to the present embodiment, the first tapered outer peripheral surface 3684 (the tapered outer peripheral surface) and the first-stage cylindrical outer peripheral surface 3682 of the coupling shaft-shaped portion 36 (the rod-shaped portion) are continuous via a first R-chamfered portion 3686 (an R-chamfered portion).

According to this configuration, in the press-fitting step, the inner peripheral surface 380 of the pit portion 38*a* of the cap 37 (the second component) can be pressed by the first R-chamfered portion 3686 (the R-chamfered portion) of the coupling shaft-shaped portion 36 (the rod-shaped portion). Therefore, sharp distal end portions 382*a* of an uneven tool mark formed on the inner peripheral surface 380 of the cap 37 (the second component) can be deformed to be flat by the first R-chamfered portion 3686 (the R-chamfered portion) of the coupling shaft-shaped portion 36 (the rod-shaped portion). As a result, it is possible to suppress galling that may occur when the first-stage cylindrical outer peripheral surface 3682 of the coupling shaft-shaped portion 36 (the rod-shaped portion) and the inner peripheral surface 380 of the cap 37 (the second component) are press-fitted, and it is also possible to suppress a deterioration in coupling strength caused by galling.

Modification of First Embodiment

Figure 11:
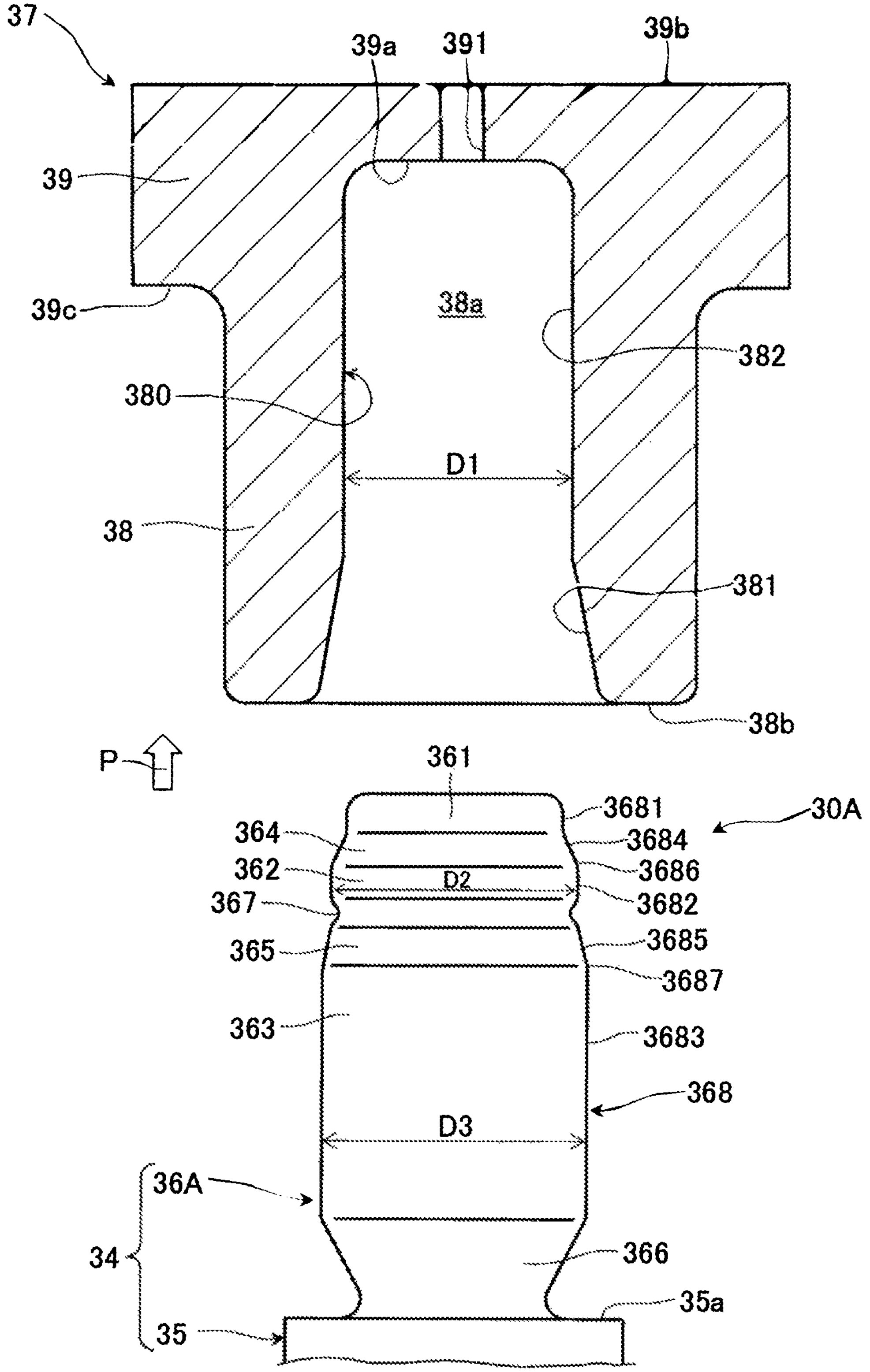
FIG. 11 is a cross-sectional view illustrating structures of two components (a valve member and a cap), which constitute a coupling body, before coupled (before press-fitted) according to a modification of the first embodiment of the present invention.
Figure 12:
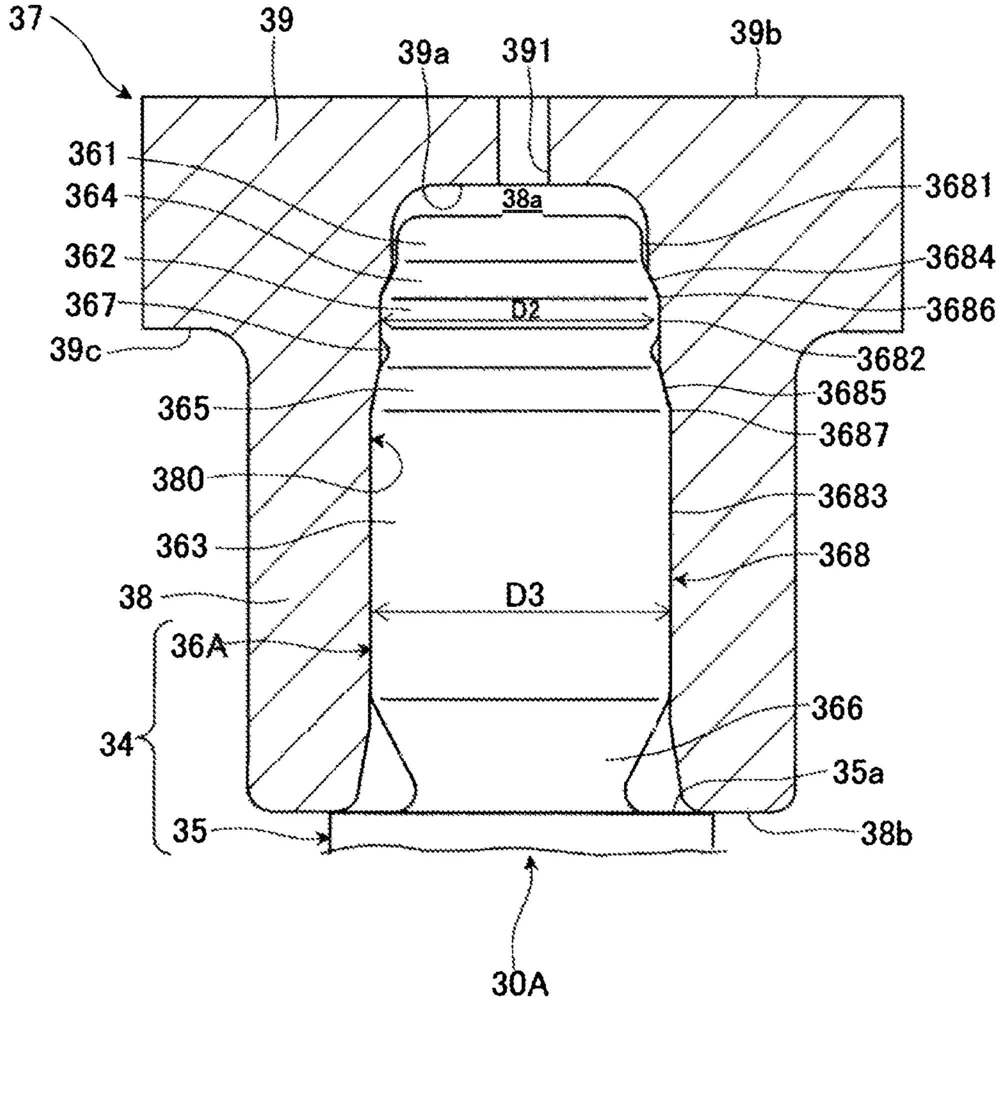
FIG. 12 is a cross-sectional view illustrating states of the two components (the valve member and the cap) constituting the coupling body according to the modification of the first embodiment of the present invention illustrated in FIG. 11 when having been completely press-fitted (a structure of the coupling body).
Figure 13:
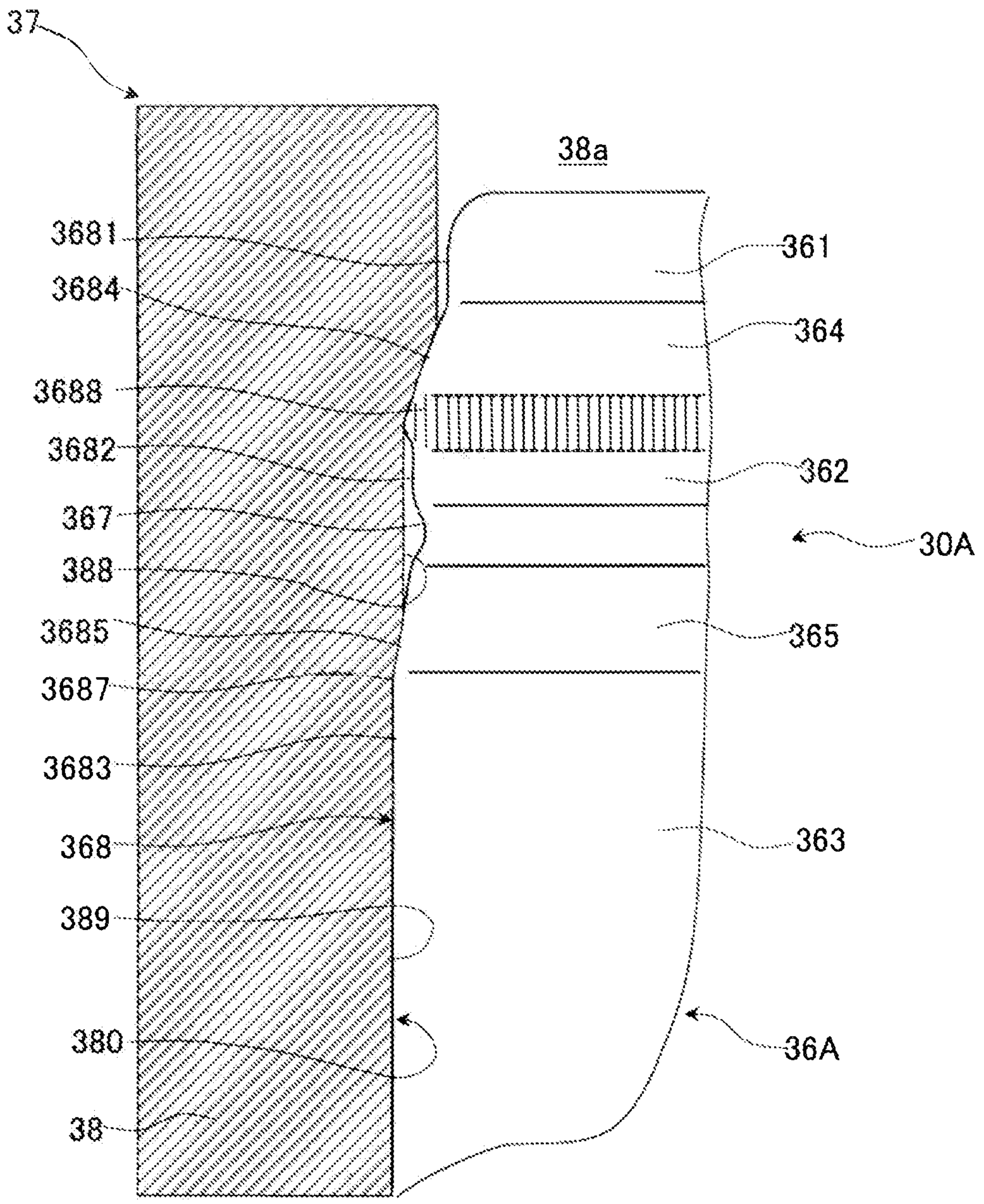
FIG. 13 is a schematic view illustrating a coupling state between the two components (the valve member and the cap) constituting the coupling body according to the modification of the first embodiment of the present invention when galling occurs in a step of press-fitting the two components.

Next, a coupling body and a method for manufacturing the coupling body according to a modification of the first embodiment of the present invention will be described with reference to FIGS. 11 to 13. FIG. 11 is a cross-sectional view illustrating structures of two components (a valve member and a cap), which constitute a coupling body, before coupled (before press-fitted) according to the modification of the first embodiment of the present invention. FIG. 12 is a cross-sectional view illustrating states of the two components (the valve member and the cap) constituting the coupling body according to the modification of the first embodiment of the present invention illustrated in FIG. 11 when having been completely press-fitted (a structure of the coupling body). FIG. 13 is a schematic view illustrating a coupling state between the two components (the valve member and the cap) constituting the coupling body according to the modification of the first embodiment of the present invention when galling occurs in a step of press-fitting the two components. Note that, in FIGS. 11 to 13, components denoted by the same reference numerals as those illustrated in FIGS. 1 to 10 are similar parts, and thus, the detailed description thereof will be omitted.

The coupling body and the method for manufacturing the coupling body according to the modification of the first embodiment of the present invention illustrated in FIGS. 11 and 12 are different from those in the first embodiment in that, in a first forming step of forming a coupling shaft-shaped portion 36A in a protruding portion 34 of a valve member 30A, an annular recess portion 367 is formed closer to a distal end side than the second tapered portion 365 between the processing portion 362 and the coupling portion 363 in the coupling shaft-shaped portion 36A. As illustrated in FIG. 12, the recess portion 367 has an outer diameter smaller than the outer diameter D2 of the first-stage cylindrical outer peripheral surface 3682, and forms an air reservoir with the inner peripheral surface 380 of the cap 37 in the press-fitting step.

In the present modification as well, when the press fitting between the two components 30A and 37 is started, if the coupling shaft-shaped portion 36A partially abuts on the cylindrical inner peripheral surface 382 of the cap 37, it is assumed that galling occurs on the first-stage cylindrical outer peripheral surface 3682 of the processing portion 362 of the coupling shaft-shaped portion 36A as illustrated in FIG. 13, similarly to the first embodiment. In this case, even if a new surface is generated by the galling on the first-stage cylindrical outer peripheral surface 3682, an air reservoir (space) is formed by the recess portion 367 provided closer to the rear side of the coupling shaft-shaped portion 36A in the press-fitting direction P than the first-stage cylindrical outer peripheral surface 3682 and the inner peripheral surface 380 of the cap 37, and thus, a new surface of a galling portion 3688 generated on the first-stage cylindrical outer peripheral surface 3682 is oxidized by air (oxygen) in the air reservoir, and an oxide film is formed on the new surface. Therefore, it is possible to suppress the galling portion 3688 of the first-stage cylindrical outer peripheral surface 3682 from being seized.

In addition, even if the distal end portion 382*a* (see FIG. 5) of the ridge portion of the tool mark formed on the cylindrical inner peripheral surface 382 of the cap 37 by the first R-chamfered portion 3686 and the first-stage cylindrical outer peripheral surface 3682 illustrated in FIG. 11 is cut and a new surface appears, an oxide film is formed on the new surface by air in the air reservoir formed by the recess portion 367 of the coupling shaft-shaped portion 36A and the inner peripheral surface 380 of the cap 37. Therefore, seizure is less likely to occur when the second-stage cylindrical outer peripheral surface 3683 and the inner peripheral surface 380 of the cap 37 are press-fitted.

That is, even in a case of the coupling body and the method for manufacturing the coupling body according to the modification of the first embodiment, similarly to the first embodiment, the fastening allowance (the press-fitting allowance) for achieving coupling through the deformation in the elastoplastic region is determined by a step (a difference in diameter) between the second-stage cylindrical outer peripheral surface 3683 and the first-stage cylindrical outer peripheral surface 3682 of the valve member 30A, not by a difference in diameter between the two components, the valve member 30A and the cap 37. Therefore, the fastening allowance (the press-fitting allowance) varies within a processing accuracy (dimensional tolerance) range of the valve member 30A, but is not affected by accuracy (dimensional tolerance) in processing the two components 30A and 37. Therefore, it is possible to reduce a variation in coupling strength without increasing accuracy in processing the two components 30A and 37.

As described above, in the method for manufacturing the coupling body according to the present modification, in the first forming step, an annular recess portion 367 having an outer diameter smaller than the outer diameter of the first-stage cylindrical outer peripheral surface 3682 is formed at a position between the first-stage cylindrical outer peripheral surface 3682 and the second-stage cylindrical outer peripheral surface 3683 in the coupling shaft-shaped portion 36A (the rod-shaped portion) of the valve member 30A (the first component). In addition, in the press-fitting step, an air reservoir is formed by the recess portion 367 of the coupling shaft-shaped portion 36A (the rod-shaped portion) of the valve member 30A (the first component) and the inner peripheral surface 380 of the cap 37 (the second component).

According to this method, even if a new surface is generated on the first-stage cylindrical outer peripheral surface 3682 due to galling, an oxide film is generated on the new surface of the first-stage cylindrical outer peripheral surface 3682 by air in the air reservoir formed by the recess portion 367 of the coupling shaft-shaped portion 36A and the inner peripheral surface 380 of the cap 37, thereby making it possible to suppress seizure of the galling portion 3688 of the first-stage cylindrical outer peripheral surface 3682.

As described above, in the coupling body according to the present modification, the coupling shaft-shaped portion 36A (the rod-shaped portion) has an annular recess portion 367 positioned between the first-stage cylindrical outer peripheral surface 3682 and the second-stage cylindrical outer peripheral surface 3683 and having an outer diameter smaller than the outer diameter of the first-stage cylindrical outer peripheral surface 3682.

According to this configuration, since an air reservoir is formed by the recess portion 367 of the coupling shaft-shaped portion 36A (the rod-shaped portion) of the valve member 30A (the first component) and the inner peripheral surface 380 of the cap 37 (the second component) at the time of press-fitting, even if a new surface is generated on the first-stage cylindrical outer peripheral surface 3682 due to galling, an oxide film is generated on the new surface of the first-stage cylindrical outer peripheral surface 3682 by air in the air reservoir. Therefore, it is possible to suppress seizure of the galling portion 3688 of the first-stage cylindrical outer peripheral surface 3682.

Second Embodiment

Figure 14:
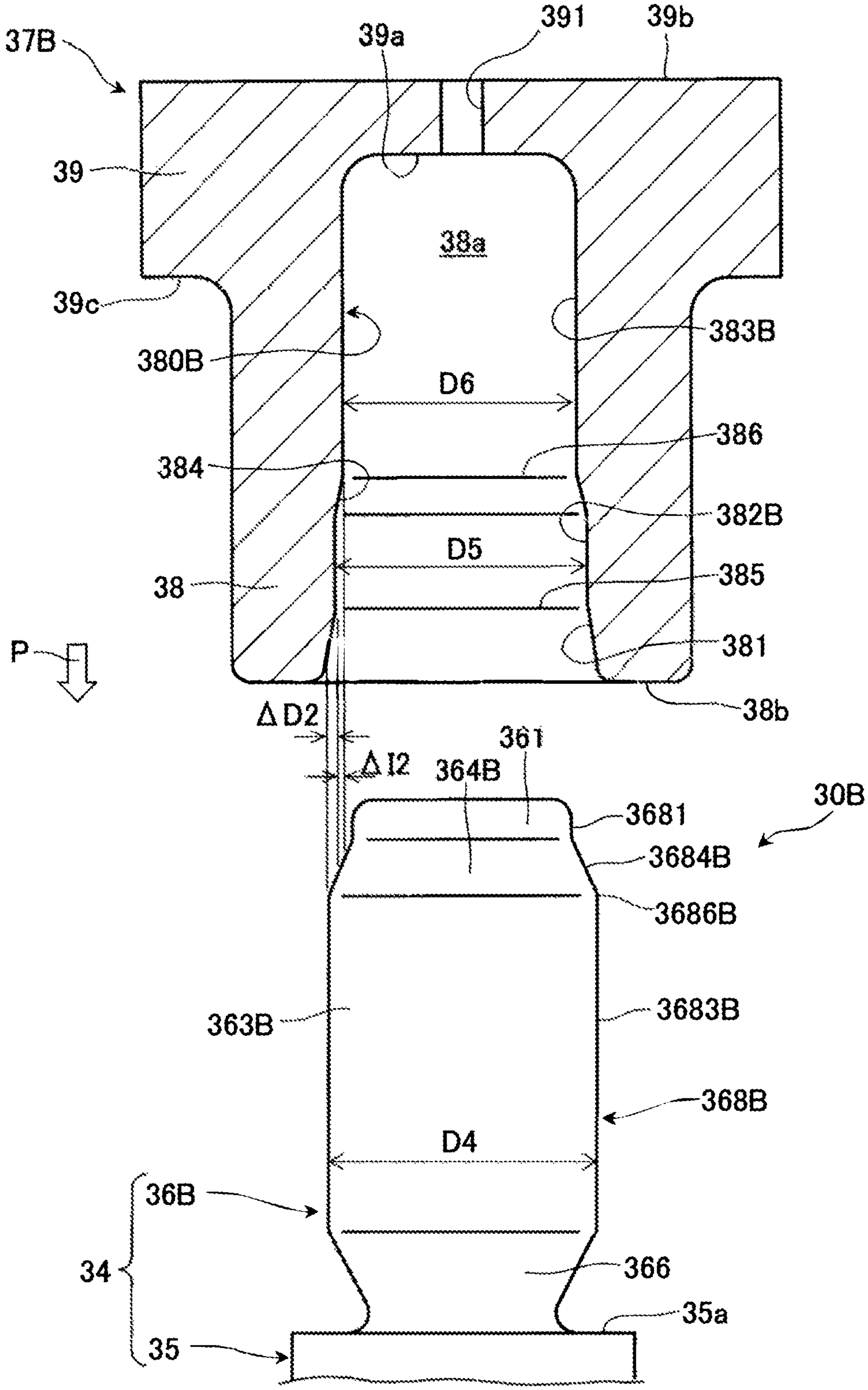
FIG. 14 is a cross-sectional view illustrating structures of two components (a valve member and a cap), which constitutes a coupling body, before coupled (before press-fitted) according to a second embodiment of the present invention.
Figure 15:
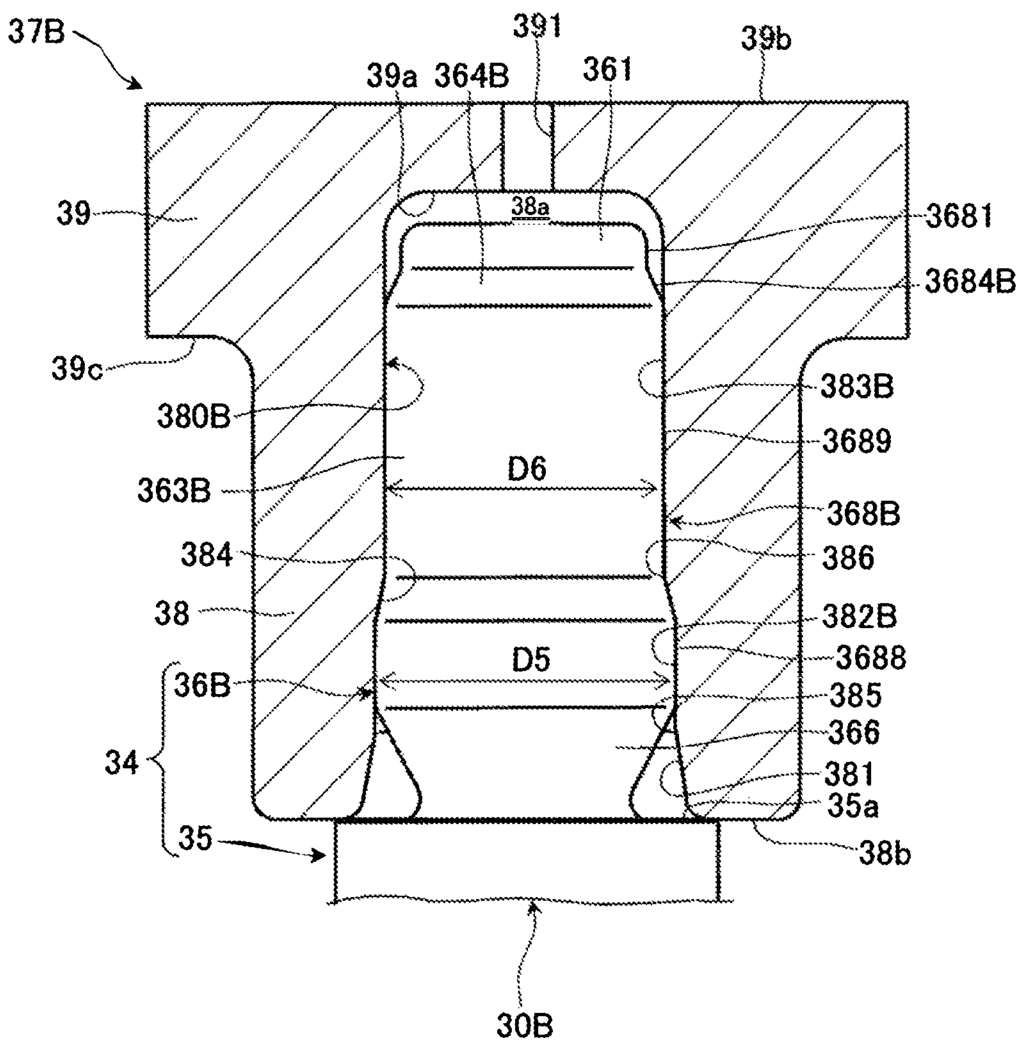
FIG. 15 is a cross-sectional view illustrating states of the two components (the valve member and the cap) constituting the coupling body according to the second embodiment of the present invention when having been completely press-fitted (a structure of the coupling body).

Next, a coupling body and a method for manufacturing the coupling body according to a second embodiment of the present invention will be described with reference to FIGS. 14 and 15. FIG. 14 is a cross-sectional view illustrating structures of two components (a valve member and a cap), which constitutes a coupling body, before coupled (before press-fitted) according to the second embodiment of the present invention. FIG. 15 is a cross-sectional view illustrating states of the two components (the valve member and the cap) constituting the coupling body according to the second embodiment of the present invention when having been completely press-fitted (a structure of the coupling body). Note that, in FIGS. 14 and 15, components denoted by the same reference numerals as those illustrated in FIGS. 1 to 13 are similar parts, and thus, the detailed description thereof will be omitted.

The main points of differences of the coupling body and the method for manufacturing the coupling body according to the second embodiment of the present invention illustrated in FIGS. 14 and 15 from those according to the first embodiment are that a cap 37B, which is a second component, is formed of a component having a relatively higher hardness than a valve member 30B, which is s first component, and in the press-fitting step, the two components 30B and 37B are coupled to each other by performing two-stage deformations, i.e., a first-stage deformation in a plastic region and a second-stage deformation in an amount smaller than that of the first-stage deformation, with respect to an outer peripheral surface 368B of a coupling shaft-shaped portion 36B of the valve member 30B having a relatively low hardness. The coupling shaft-shaped portion 36B of the valve member 30B can be configured as a solid or hollow shaft-shaped portion as long as the outer peripheral surface 368B is deformed in the plastic region and in the elasto-plastic region. The deformation generated on the inner peripheral surface 380 of the cap 37B having a relatively high hardness in the press-fitting step can be ignored as compared with the deformation of the outer peripheral surface 368B of the coupling shaft-shaped portion 36B of the valve member 30B having a relatively low hardness.

Specifically, in the first forming step, as illustrated in FIG. 14, the coupling shaft-shaped portion 36B of the valve member 30B is formed to include an introduction portion 361 which is a distal end portion, a coupling portion 363B positioned closer to the sliding shaft-shaped portion 35 than the introduction portion 361, a tapered portion 364B connecting the introduction portion 361 and the coupling portion 363B, and a neck portion 366 connected to the coupling portion 363B and the sliding shaft-shaped portion 35. The outer peripheral surface 368B of the coupling shaft-shaped portion 36B includes an introduction surface 3681 of the introduction portion 361 having an outer diameter smaller than an inner peripheral surface 380B of the pit portion 38*a* of the cap 37B, a cylindrical outer peripheral surface 3683B of the coupling portion 363B having an outer diameter D4 larger than the outer diameter of the introduction surface 3681, and a tapered outer peripheral surface 3684B of the tapered portion 364B having a diameter that gradually decreases from the coupling portion 363B side toward the introduction portion 361 side (the distal end side). The tapered outer peripheral surface 3684B and the cylindrical outer peripheral surface 3683B are continuous via an R-chamfered portion 3686B. The outer diameter D4 of the cylindrical outer peripheral surface 3683B is, for example, about 1 mm.

In the second forming step, as illustrated in FIG. 14, the inner peripheral surface 380B of the pit portion 38*a* of the cap 37B is formed to include a first tapered inner peripheral surface 381 positioned on the open side, a first-stage cylindrical inner peripheral surface 382B positioned closer to a rear side (the bottom surface 39*a*) in the press-fitting direction P than the first tapered inner peripheral surface 381, a second-stage cylindrical inner peripheral surface 383B positioned closer to a rear side (the bottom surface 39*a*) in the press-fitting direction P than the first-stage cylindrical inner peripheral surface 382B, and a second tapered inner peripheral surface 384 connecting the first-stage cylindrical inner peripheral surface 382B and the second-stage cylindrical inner peripheral surface 383B.

The first tapered inner peripheral surface 381 is formed to gradually increase in diameter toward the open side of the pit portion 38*a*. The first-stage cylindrical inner peripheral surface 382B is configured to have an inner diameter D5 smaller than the outer diameter D4 of the cylindrical outer peripheral surface 3683B of the coupling shaft-shaped portion 36B. The second-stage cylindrical inner peripheral surface 383B is configured to have an inner diameter D6 smaller than the inner diameter D5 of the first-stage cylindrical inner peripheral surface 382B. The second tapered inner peripheral surface 384 is formed to gradually decrease in diameter from the first-stage cylindrical inner peripheral surface 382B side toward the second-stage cylindrical inner peripheral surface 383B side (the bottom surface 39*a* side). The first tapered inner peripheral surface 381 and the first-stage cylindrical inner peripheral surface 382B are continuous via a first R-chamfered portion 385. The second tapered inner peripheral surface 384 and the second-stage cylindrical inner peripheral surface 383B are continuous via a second R-chamfered portion 386.

The first-stage cylindrical inner peripheral surface 382B is a portion for a first-stage deformation in which the outer peripheral surface 368B of the coupling shaft-shaped portion 36B of the valve member 30B is plastically processed to decrease its diameter at the time of press fitting. The inner diameter D5 of the first-stage cylindrical inner peripheral surface 382B is set to a size having a deformation allowance ΔD2 that causes a deformation in a plastic region on the cylindrical outer peripheral surface 3683B with respect to the outer diameter D4 of the cylindrical outer peripheral surface 3683B of the coupling shaft-shaped portion 36B. An axial length of the first-stage cylindrical inner peripheral surface 382B may be any length as long as the plastic processing can be performed.

The second-stage cylindrical inner peripheral surface 383B protrudes inward in the radial direction to form a step with respect to the first-stage cylindrical inner peripheral surface 382B, and is a portion to be coupled to the outer peripheral surface 368B of the coupling shaft-shaped portion 36B. As compared with the inner diameter D5 of the first-stage cylindrical inner peripheral surface 382B, the inner diameter D6 of the second-stage cylindrical inner peripheral surface 383B is set to a size having a fastening allowance ΔI2 (a press-fitting allowance) for deforming the outer peripheral surface 368B of the coupling shaft-shaped portion 36B (having an outer diameter of the same dimension as the inner diameter D5) having a diameter that has been decreased through plastic deformation by the first-stage cylindrical inner peripheral surface 382B in an amount smaller than the deformation amount of the outer peripheral surface 368B of the coupling shaft-shaped portion 36B deformed by the first-stage cylindrical inner peripheral surface 382B. That is, a difference in inner diameter (D5–D6) between the first-stage cylindrical inner peripheral surface 382B and the second-stage cylindrical inner peripheral surface 383B is set as the fastening allowance ΔI2 of the coupling body. Specifically, the fastening allowance ΔI2 is set to a size that causes a deformation within an elastic region or in a plastic region equal to or smaller than a predetermined region (which may hereinafter be referred to as an elastoplastic deformation). In the present embodiment, the plastic region equal to or smaller than the predetermined region refers to a plastic region in which a deformation amount is equal to or less than 10%, preferably equal to or less than 5%, of a diameter in a press-fitted state (the inner diameter D5 of the first-stage cylindrical inner peripheral surface 382B). An axial length of the second-stage cylindrical inner peripheral surface 383B is set to a length at which necessary coupling strength is obtained.

In the press-fitting step, when the coupling shaft-shaped portion 36B is press-fitted up to the first-stage cylindrical inner peripheral surface 382B of the pit portion 38*a* of the cap 37B, the first-stage cylindrical inner peripheral surface 382B plastically processes the tapered outer peripheral surface 3684B and the cylindrical outer peripheral surface 3683B of the coupling shaft-shaped portion 36B. As a result, the diameter of the cylindrical outer peripheral surface 3683B of the coupling shaft-shaped portion 36B is decreased to have the same dimension as the inner diameter D5 of the first-stage cylindrical inner peripheral surface 382B of the cap 37B, thereby forming a plastically processed surface 3688. That is, the plastically processed surface 3688 is formed by deforming the cylindrical outer peripheral surface 3683B in the plastic region, and works advantageously on coupling strength due to work hardening accompanied by the plastic deformation.

In addition, when the cylindrical outer peripheral surface 3683B of the coupling shaft-shaped portion 36B is plastically processed, sharp distal end portions (see the left diagram in FIG. 5) of an uneven portion of a tool mark formed on the cylindrical outer peripheral surface 3683B become leveled, rather than being cut, by the first R-chamfered portion 385 of the inner peripheral surface 380B of the cap 37B, and distal end portions (see the right diagram in FIG. 7) of an uneven portion of the plastically processed surface 3688 are flat surfaces in a deformed state. Therefore, it is possible to suppress generation of a new surface at the distal end portion of the uneven portion of the plastically processed surface 3688.

In the press-fitting step, as illustrated in FIG. 15, the entire coupling shaft-shaped portion 36B is press-fitted into the pit portion 38*a* of the cap 37B. At this time, the second-stage cylindrical inner peripheral surface 383B of the cap 37B deforms the plastically processed surface 3688 of the coupling shaft-shaped portion 36B, which has been subjected to the deformation in the plastic region, within an elastic region or within a plastic region (an elastoplastic region) equal to or smaller than a predetermined region. As a result, a coupling outer peripheral surface 3689, which has been generated when the plastically processed surface 3688 is deformed in the elastic region, is are coupled to the second-stage cylindrical inner peripheral surface 383B, thereby securing coupling strength between the cap 37B and the valve member 30B of the coupling body.

That is, the coupling body according to the present embodiment is configured in such a manner that the inner peripheral surface 380B of the pit portion 38*a* of the cap 37B having a relatively high hardness includes a first-stage cylindrical inner peripheral surface 382B and a second-stage cylindrical inner peripheral surface 383B protruding in the radial direction further inward than the first-stage cylindrical inner peripheral surface 382B to form a step with respect to the first-stage cylindrical inner peripheral surface 382B, and the step (the difference D5–D6 in inner diameter) between the second-stage cylindrical inner peripheral surface 383B and the first-stage cylindrical inner peripheral surface 382B is a fastening allowance (a press-fitting allowance) with respect to the outer peripheral surface 368B of the coupling shaft-shaped portion 36B. The inner diameter D5 of the first-stage cylindrical inner peripheral surface 382B is set, relative to the outer diameter D4 of the cylindrical outer peripheral surface 3683B of the coupling shaft-shaped portion 36B, within a range in which the cylindrical outer peripheral surface 3683B is deformed in the plastic region, and the fastening allowance (the difference in inner diameter between the second-stage cylindrical inner peripheral surface 383B and the first-stage cylindrical inner peripheral surface 382B) is set within a range in which the plastically processed surface 3688 of the coupling shaft-shaped portion 36B, which has been deformed to have the same dimension as the inner diameter D5 of the first-stage cylindrical inner peripheral surface 382B of the cap 37B, is deformed in the elastic region or in the plastic region equal to or smaller than the predetermined region. As a result, the outer peripheral surface 368B of the coupling shaft-shaped portion 36B having a relatively low hardness includes a plastically processed surface 3688 coupled to the first-stage cylindrical inner peripheral surface 382B in a plastically deformed state, and also includes a coupling outer peripheral surface 3689 coupled to the second-stage cylindrical inner peripheral surface 383B of the cap 37B in a deformed state within the elastic region or within the plastic region equal to or smaller than the predetermined region.

As described above, the press-fitting step includes a first stage at which the outer peripheral surface 368B of the coupling shaft-shaped portion 36B is deformed in the plastic region by the first-stage cylindrical inner peripheral surface 382B of the cap 37B, and a second stage at which the outer peripheral surface 368B (the plastically processed surface 3688) of the coupling shaft-shaped portion 36B subjected to the deformation in the plastic region is deformed by the second-stage cylindrical inner peripheral surface 383B of the cap 37B in an amount smaller than the deformation amount at the first stage (specifically, in the elastic region or in the plastic region equal to or smaller than the predetermined region).

In the present embodiment as well, the fastening allowance (the press-fitting allowance) between the two components 30B and 37B of the coupling body is determined by the step (the difference in inner diameter) between the first-stage cylindrical inner peripheral surface 382B and the second-stage cylindrical inner peripheral surface 383B of the cap 37B as illustrated in FIG. 14, rather than being determined by the difference in diameter between the two components like the fastening allowance between the valve member 90 and the cap 97 of the coupling body in the comparative example illustrated in FIG. 7. That is, the fastening allowance of the coupling body is defined by a dimensional difference of the cap 37B. Therefore, the fastening allowance between the two components 30B and 37B varies only within a dimensional tolerance range of the cap 37B. Therefore, it is possible to reduce a variation in coupling strength without increasing accuracy in processing the two components 30B and 37B.

The method for manufacturing the coupling body according to the second embodiment described above includes a first forming step of forming a coupling shaft-shaped portion 36B (a rod-shaped portion) in a valve member 30B (a first component), a second forming step of forming a pit portion 38*a* in a cap 37B (a second component), and a press-fitting step of press-fitting the coupling shaft-shaped portion 36B (the rod-shaped portion) of the valve member 30B (the first component) into the pit portion 38*a* of the cap 37B (the second component). Of an outer peripheral surface 368B of the coupling shaft-shaped portion 36B (the rod-shaped portion) of the valve member 30B (the first component) and an inner peripheral surface 380B of the pit portion 38*a* of the cap 37B (the second component), the inner peripheral surface 380B (a peripheral surface) of the cap 37B (a high-hardness component) having a relatively high hardness includes a first-stage cylindrical inner peripheral surface 382B (a first-stage cylindrical surface) having a diameter difference with respect to the outer peripheral surface 368B (a peripheral surface) of the coupling shaft-shaped portion 36B of the valve member 30B (a low-hardness component) having a relatively low hardness, and a second-stage cylindrical inner peripheral surface 383B (a second-stage cylindrical surface) positioned closer to a rear side in a press-fitting direction P than the first-stage cylindrical inner peripheral surface 382B (the first-stage cylindrical surface) and protruding in the radial direction to form a step with respect to the first-stage cylindrical inner peripheral surface 382B (the first-stage cylindrical surface). The press-fitting step includes a first stage at which the outer peripheral surface 368B (the peripheral surface) of the coupling shaft-shaped portion 36B of the valve member 30B (the low-hardness component) is deformed in a plastic region by the first-stage cylindrical inner peripheral surface 382B (the first-stage cylindrical surface) of the cap 37B (the high-hardness component), and a second stage at which a plastically processed surface 3688 (a peripheral surface) of the valve member 30B (the low-hardness component) subjected to the deformation in the plastic region is deformed by the second-stage cylindrical inner peripheral surface 383B (the second-stage cylindrical surface) of the cap 37B (the high-hardness component) in an amount smaller than the deformation amount at the first stage.

According to this method, the two components 30B and 37B are coupled to each other through the first stage at which the outer peripheral surface 368B (the peripheral surface) of the valve member 30B (the low-hardness component) is plastically deformed by the first-stage cylindrical inner peripheral surface 382B (the first-stage cylindrical surface) of the cap 37B (the high-hardness component) to be formed to have the same dimension as the diameter of the first-stage cylindrical inner peripheral surface 382B (the first-stage cylindrical surface), and then, the second stage at which the outer peripheral surface 368B (the peripheral surface) of the valve member 30B (the low-hardness component) is further deformed by the second-stage cylindrical inner peripheral surface 383B (the second-stage cylindrical surface) of the cap 37B (the high-hardness component) in an amount smaller than the deformation amount at the first stage. Therefore, a fastening allowance (a press-fitting allowance) for achieving coupling through the second-stage deformation is determined by a step (a difference in diameter) between the second-stage cylindrical inner peripheral surface 383B (the second-stage cylindrical surface) and the first-stage cylindrical inner peripheral surface 382B (the first-stage cylindrical surface) of the cap 37B (the high-hardness component), not by a difference in diameter between the two components, the valve member 30B (the low-hardness component) and the cap 37B (the high-hardness component). Therefore, the fastening allowance (the press-fitting allowance) varies within a processing accuracy (dimensional tolerance) range of the cap 37B (the high-hardness component), but is not affected by accuracy (dimensional tolerance) in processing the two components 30B and 37B. Therefore, it is possible to reduce a variation in coupling strength without increasing accuracy in processing the two components 30B and 37B.

In the method for manufacturing the coupling body according to the present embodiment, in the second forming step, a first tapered inner peripheral surface 381 (a tapered inner peripheral surface) positioned closer to the open side than the first-stage cylindrical inner peripheral surface 382B and having a diameter that increases toward the open side is further formed on the inner peripheral surface 380B of the pit portion 38*a* of the cap 37B (the second component), and the first tapered inner peripheral surface 381 (the tapered inner peripheral surface) and the first-stage cylindrical inner peripheral surface 382B are continuous via a first R-chamfered portion 385 (an R-chamfered portion). In the press-fitting step, the outer peripheral surface 368B of the coupling shaft-shaped portion 36B (the rod-shaped portion) of the valve member 30B (the first component) is pressed by the first R-chamfered portion 385 (the R-chamfered portion) of the inner peripheral surface 380B of the cap 37B (the second component).

According to this method, sharp distal end portions of an uneven tool mark formed on the outer peripheral surface 368B of the coupling shaft-shaped portion 36B (the rod-shaped portion) of the valve member 30B (the first component) can be deformed to be flat by the first R-chamfered portion 385 (the R-chamfered portion) of the cap 37B (the second component). Therefore, it is possible to suppress galling that may occur when the first-stage cylindrical inner peripheral surface 382B of the cap 37B (the second component) and the outer peripheral surface 368B of the coupling shaft-shaped portion 36B (the rod-shaped portion) are press-fitted, and it is also possible to suppress a deterioration in coupling strength caused by galling.

As described above, in the coupling body according to the present embodiment, the valve member 30B (the first component) having the coupling shaft-shaped portion 36B (the rod-shaped portion) and the cap 37B (the second component) having the pit portion 38*a* are coupled to each other by press-fitting the coupling shaft-shaped portion 36B (the rod-shaped portion) and the pit portion 38*a*. Of an outer peripheral surface 368B of the coupling shaft-shaped portion 36B (the rod-shaped portion) of the valve member 30B (the first component) and an inner peripheral surface 380B of the pit portion 38*a* of the cap 37B (the second component), the inner peripheral surface 380B (a peripheral surface) of the cap 37B (a high-hardness component) having a relatively high hardness includes a first-stage cylindrical inner peripheral surface 382B (a first-stage cylindrical surface), and a second-stage cylindrical inner peripheral surface 383B (a second-stage cylindrical surface) positioned closer to a rear side in a press-fitting direction P than the first-stage cylindrical inner peripheral surface 382B (the first-stage cylindrical surface) and protruding in the radial direction further than the first-stage cylindrical inner peripheral surface 382B (the first-stage cylindrical surface) to form a step with respect to the first-stage cylindrical inner peripheral surface 382B (the first-stage cylindrical surface). Of an outer peripheral surface 368B of the coupling shaft-shaped portion 36B (the rod-shaped portion) of the valve member 30B (the first component) and an inner peripheral surface 380B of the pit portion 38*a* of the cap 37B (the second component), a partial portion of the outer peripheral surface 368B (a peripheral surface) of the coupling shaft-shaped portion 36B of the valve member 30B (a low-hardness component) having a relatively low hardness is coupled to the first-stage cylindrical inner peripheral surface 382B (the first-stage cylindrical surface) in a plastically deformed state, and another portion of the outer peripheral surface 368B (the peripheral surface) of the coupling shaft-shaped portion 36B of the valve member 30B (the low-hardness component) is coupled to the second-stage cylindrical inner peripheral surface 383B (the second-stage cylindrical surface) in a deformed state in an elastic region or in a plastic region (an elastoplastic region) equal to or smaller than a predetermined region.

According to this configuration, by providing the first-stage cylindrical inner peripheral surface 382B (the first-stage cylindrical surface) and the second-stage cylindrical inner peripheral surface 383B (the second-stage cylindrical surface) forming a step on the inner peripheral surface 380B (the peripheral surface) of the cap 37B (the high-hardness component), a partial portion of the outer peripheral surface 368B (the peripheral surface) of the coupling shaft-shaped portion 36B of the valve member 30B (the low-hardness component) having a relatively low hardness is coupled to the first-stage cylindrical inner peripheral surface 382B (the first-stage cylindrical surface) in a plastically deformed state, and another portion of the outer peripheral surface 368B (the peripheral surface) of the coupling shaft-shaped portion 36B of the valve member 30B (the low-hardness component) is coupled to the second-stage cylindrical inner peripheral surface 383B (the second-stage cylindrical surface) in a deformed state in an elastic region or in a plastic region (an elastoplastic region) equal to or smaller than a predetermined region. That is, the fastening allowance (the press-fitting allowance) for achieving coupling through the deformation in the elastoplastic region is determined by a step (a difference in diameter) between the second-stage cylindrical inner peripheral surface 383B (the second-stage cylindrical surface) and the first-stage cylindrical inner peripheral surface 382B (the first-stage cylindrical surface) of the cap 37B (the high-hardness component), not by a difference in diameter between the two components, the valve member 30B (the low-hardness component) and the cap 37B (the high-hardness component). Therefore, the fastening allowance (the press-fitting allowance) varies within a processing accuracy (dimensional tolerance) range of the cap 37B (the high-hardness component), but is not affected by accuracy (dimensional tolerance) in processing the two components 30B and 37B. Therefore, it is possible to reduce a variation in coupling strength without increasing accuracy in processing the two components 30B and 37B.

In the coupling body according to the present embodiment, the pit portion 38*a* of the cap 37B (the second component) further includes a first tapered inner peripheral surface 381 (a tapered inner peripheral surface) positioned closer to the open side than the first-stage cylindrical inner peripheral surface 382B and having a diameter that increases toward the open side, and the first tapered inner peripheral surface 381 (the tapered inner peripheral surface) and the first-stage cylindrical inner peripheral surface 382B of the pit portion 38*a* are continuous via a first R-chamfered portion 385 (an R-chamfered portion).

According to this configuration, in the press-fitting step, the outer peripheral surface 368B of the coupling shaft-shaped portion 36B (the rod-shaped portion) can be pressed by the first R-chamfered portion 385 (the R-chamfered portion) of the inner peripheral surface 380B of the cap 37B (the second component). Therefore, sharp distal end portions of an uneven tool mark formed on the outer peripheral surface 368B of the coupling shaft-shaped portion 36B (the rod-shaped portion) can be deformed to be flat by the first R-chamfered portion 385 (the R-chamfered portion) of the cap 37B (the second component). As a result, it is possible to suppress galling that may occur when the outer peripheral surface 368B of the coupling shaft-shaped portion 36B (the rod-shaped portion) and the first-stage cylindrical inner peripheral surface 382B of the cap 37B (the second component) are press-fitted, and it is also possible to suppress a deterioration in coupling strength caused by galling.

Other Embodiments

In each of the embodiments described above, an example of the electromagnetic fuel injection valve 1 that electromagnetically drives the coupling body of the valve member 30, 30A, or 30B and the cap 37 or 37B has been described. However, the present invention is also applicable to a fuel injection valve that is driven by a piezoelectric effect or a magnetostrictive phenomenon.

In addition, the present invention is not limited to the above-described embodiments, and includes various modifications. The above-described embodiments have been described in detail in order to explain the present invention in an easy-to-understand manner, and are not necessarily limited to having all the configurations described above. Some of the configurations of one embodiment may be replaced with configurations of another embodiment, and configurations of one embodiment may be added to configurations of another embodiment. In addition, other configurations may be added to some of the configurations of each embodiment, some of the configurations of each embodiment may be deleted, or some of the configurations of each embodiment may be replaced with other configurations.

In addition, in the present invention, it is also possible to use one component of the coupling body of the valve member and the cap as a feature. For example, the components of the coupling body are characterized by the following configurations.

Of two components constituting a coupling body coupled by press-fitting a rod-shaped portion (a coupling shaft-shaped portion) of a first component (a valve member) into a pit portion of a second component (a cap), a peripheral surface of a component having a relatively high hardness of an outer peripheral surface of the rod-shaped portion or an inner peripheral surface of the pit portion includes a first-stage cylindrical surface and a second-stage cylindrical surface positioned closer to a rear side in a press-fitting direction than the first-stage cylindrical surface and protruding in a radial direction further than the first-stage cylindrical surface to form a step with respect to the first-stage cylindrical surface, and a diameter of the first-stage cylindrical surface is set to a size such that a difference thereof in diameter from a peripheral surface of the low-hardness component having a relatively low hardness makes it possible to deform the peripheral surface of the low-hardness component in a plastic region, and a step between the first-stage cylindrical surface and the second-stage cylindrical surface is set to a size for deforming the plastically deformed peripheral surface of the low-hardness component within an elastic region or within a plastic region equal to or smaller than a predetermined region.

REFERENCE SIGNS LIST

- 1 fuel injection valve
- 30, 30A, 30B valve member (first component)
- 34 protruding portion
- 36, 36A, 36B coupling shaft-shaped portion (rod-shaped portion)

367 recess portion
368, 368B outer peripheral surface (peripheral surface)
3682 first-stage cylindrical outer peripheral surface (first-stage cylindrical surface)
3683 second-stage cylindrical outer peripheral surface (second-stage cylindrical surface)
3684 first tapered outer peripheral surface (tapered outer peripheral surface)
3686 first R-chamfered portion (R-chamfered portion)
37, 37B cap (second component)
38*a* pit portion
380, 380B inner peripheral surface (peripheral surface)
382B first-stage cylindrical inner peripheral surface (first-stage cylindrical surface)
383B second-stage cylindrical inner peripheral surface (second-stage cylindrical surface)
381 first tapered inner peripheral surface (tapered inner peripheral surface)
385 first R-chamfered portion (R-chamfered portion)

The invention claimed is:

1. A method for manufacturing a coupling body in which a first component and a second component are coupled to each other, the method comprising:
- a first forming step of forming a rod-shaped portion in the first component;
- a second forming step of forming a pit portion in the second component; and
- a press-fitting step of press-fitting the rod-shaped portion of the first component into the pit portion of the second component,
- wherein an outer peripheral surface of the rod-shaped portion of the first component having a relatively higher hardness than an inner peripheral surface of the pit portion of the second component includes:
- a first-stage cylindrical outer peripheral surface having an outer diameter larger than an inner diameter of the inner peripheral surface of the second component; and
- a second-stage cylindrical outer peripheral surface positioned closer to a rear side in a press-fitting direction than the first-stage cylindrical outer peripheral surface and having an outer diameter larger than the outer diameter of the first-stage cylindrical outer peripheral surface to protrude in a radially outward direction with respect to the first-stage cylindrical outer peripheral surface and form a step, and
- the press-fitting step includes:
- a first stage at which the inner peripheral surface of the pit portion of the second component is deformed in a plastic region by the first-stage cylindrical outer peripheral surface of the first component; and
- a second stage at which the inner peripheral surface of the second component subjected to the deformation in the plastic region is deformed by the second-stage cylindrical outer peripheral surface of the first component in an amount smaller than the deformation amount at the first stage.

2. The method according to claim 1, wherein in the first forming step, a tapered outer peripheral surface positioned closer to a distal end side than the first-stage cylindrical outer peripheral surface and having a diameter that decreases toward the distal end side is further formed on the outer peripheral surface of the rod-shaped portion of the first component, and
- in the press-fitting step, the tapered outer peripheral surface of the rod-shaped portion of the first component is brought into contact with the inner peripheral surface of the pit portion of the second component to center the rod-shaped portion in the pit portion.

3. The method according to claim 2, wherein the tapered outer peripheral surface and the first-stage cylindrical outer peripheral surface of the first component are continuous via an R-chamfered portion, and
- in the press-fitting step, the inner peripheral surface of the pit portion of the second component is pressed by the R-chamfered portion of the rod-shaped portion of the first component.

4. The method according to claim 1, wherein in the first forming step, an annular recess portion having an outer diameter smaller than the outer diameter of the first-stage cylindrical outer peripheral surface is formed at a position between the first-stage cylindrical outer peripheral surface and the second-stage cylindrical outer peripheral surface in the rod-shaped portion of the first component, and
- in the press-fitting step, an air reservoir is formed by the recess portion of the rod-shaped portion of the first component and the inner peripheral surface of the pit portion of the second component.

* * * * *